United States Patent [19]

Swan, Jr.

[11] 4,108,928
[45] Aug. 22, 1978

[54] METHOD OF PRODUCING A VISCOUS FLOWABLE PRESSURE-COMPENSATING FITTING COMPOSITION FROM HOLLOW THERMOPLASTIC MICROBLENDS WITH THE USE OF HIGH FREQUENCY HEATING AND DISPENSING THE COMPOSITION INTO A SEALABLE, FLEXIBLE, PROTECTIVE ENCLOSURE MEANS

[75] Inventor: Jack C. Swan, Jr., Boulder, Colo.

[73] Assignee: Hanson Industries Inc., Boulder, Colo.

[21] Appl. No.: 723,912

[22] Filed: Sep. 16, 1976

Related U.S. Application Data

[63] Continuation-in-part of Ser. No. 663,213, Mar. 2, 1976, abandoned.

[51] Int. Cl.² ............................................. B29D 27/00
[52] U.S. Cl. ............................................ 264/26; 36/71; 36/93; 264/45.4; 264/223; 264/DIG. 6; 428/306; 428/315; 428/327; 521/56; 521/58; 521/915
[58] Field of Search ............... 36/71, 93; 260/2.5 B; 264/26, 51, DIG. 6, 223, 45.4; 2/413; 128/25 B; 428/306, 315, 327; 156/79; 174/25 C

[56] References Cited

U.S. PATENT DOCUMENTS

| 3,407,406 | 10/1968 | Werner et al. ............................ 2/413 |
| 3,469,576 | 9/1969 | Smith et al. .................... 128/25 B X |
| 3,552,044 | 1/1971 | Wiele .................................... 36/71 |
| 3,615,972 | 10/1971 | Morehouse et al. ................... 156/79 |
| 3,676,288 | 7/1972 | Hoyle ............................... 156/77 X |
| 3,683,104 | 8/1972 | Woodland et al. ............ 174/25 C X |
| 3,711,430 | 1/1973 | Rubens ............................... 264/26 X |
| 3,779,951 | 12/1973 | Streu ................................. 260/2.5 B |
| 3,848,038 | 11/1974 | Dench ............................... 264/26 X |
| 3,914,360 | 10/1975 | Gunderman et al. ................ 264/51 |
| 3,917,122 | 11/1975 | Swan et al. ........................ 36/93 X |
| 4,016,326 | 4/1977 | Schaefer ............................. 428/306 |
| 4,038,762 | 8/1977 | Swan ................................. 36/71 X |

FOREIGN PATENT DOCUMENTS

| 337,352 | 6/1977 | Austria. |
| 2,336,136 | 10/1974 | Fed. Rep. of Germany. |
| 922,547 | 4/1963 | United Kingdom ................... 264/26 |
| 1,465,817 | 3/1977 | United Kingdom. |

Primary Examiner—Philip Anderson
Attorney, Agent, or Firm—Merriam, Marshall & Bicknell

[57] ABSTRACT

Methods involving the use of high frequency heating means and temperature-compensating means to expand hollow, thermoplastic resinous microbeads in a controllable manner. The heat-expanded microbeads are suitable for use, for example, in providing viscous, flowable, pressure-compensating fitting materials or compositions.

54 Claims, 9 Drawing Figures

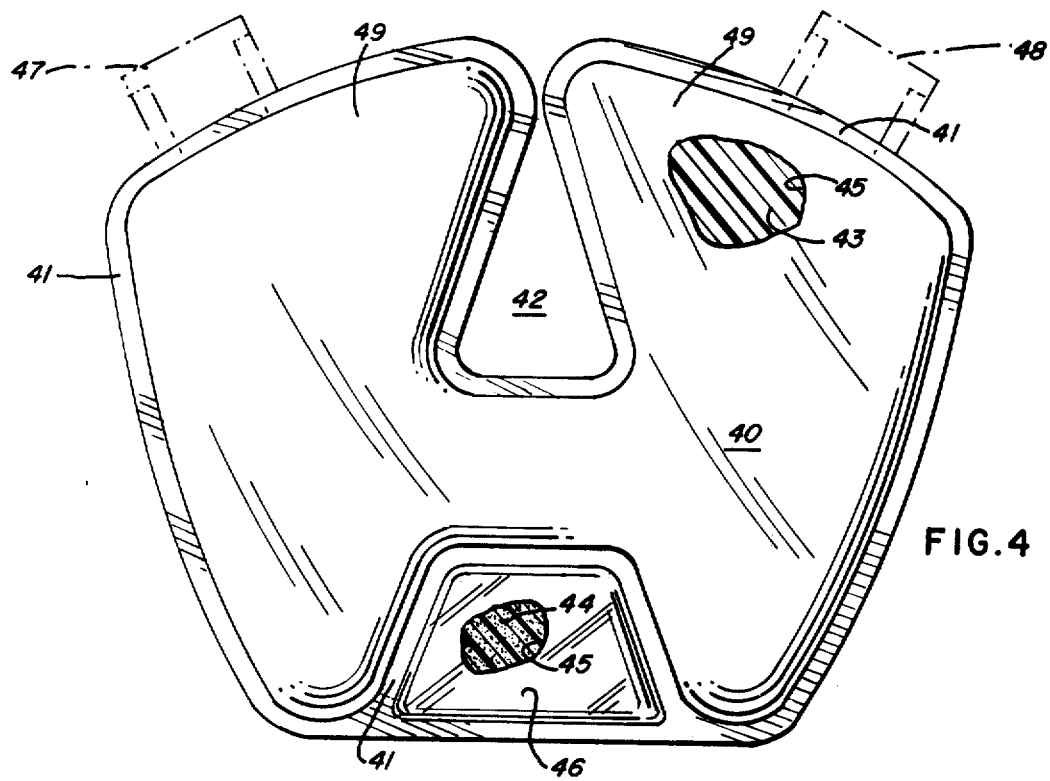
FIG. 4
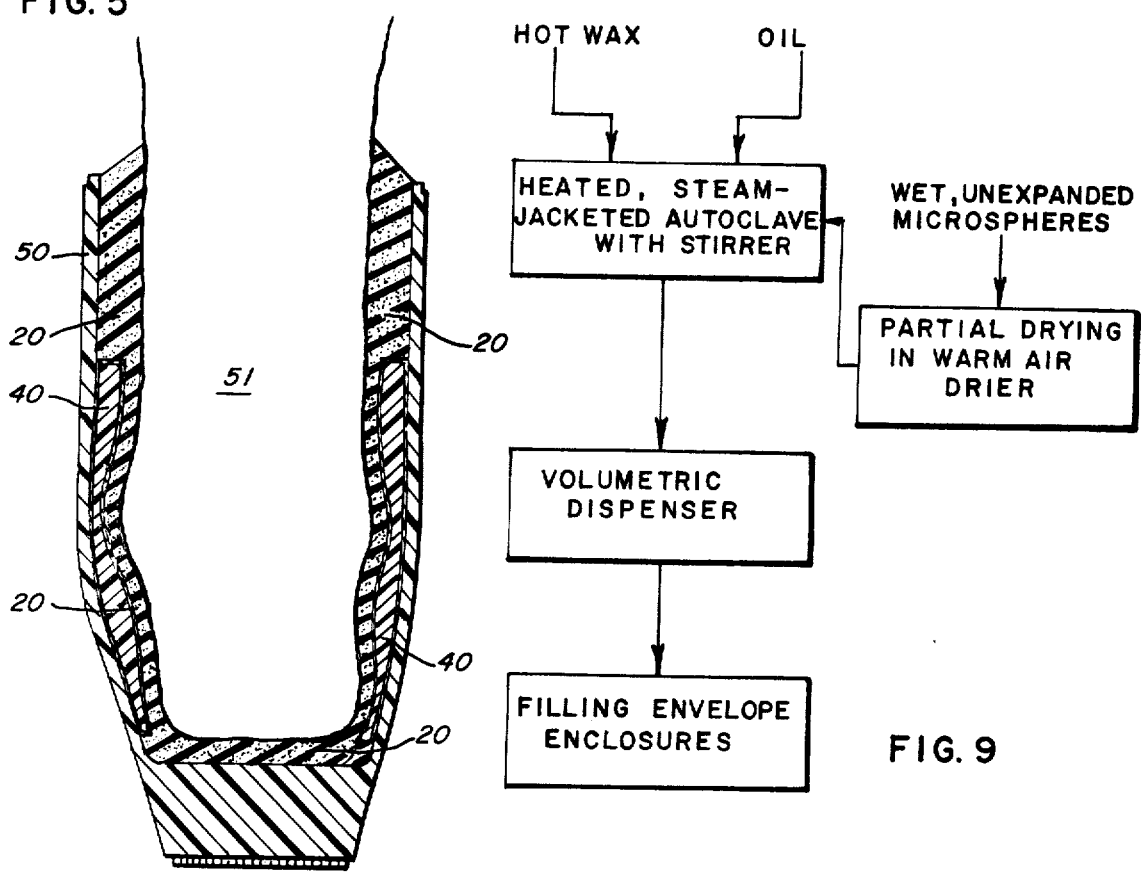
FIG. 5
FIG. 9

METHOD OF PRODUCING A VISCOUS FLOWABLE PRESSURE-COMPENSATING FITTING COMPOSITION FROM HOLLOW THERMOPLASTIC MICROBLENDS WITH THE USE OF HIGH FREQUENCY HEATING AND DISPENSING THE COMPOSITION INTO A SEALABLE, FLEXIBLE, PROTECTIVE ENCLOSURE MEANS

This application is a continuation-in-part of my allowed pending application Ser. No. 663,213, filed Mar. 2, 1976 and now abandoned.

The present invention relates to the use of high frequency heating means (e.g., microwave generator such as a magnetron) in conjunction with temperature-compensating means to expand hollow, thermoplastic resinous microbeads (e.g., microspheres) in a controllable manner, which expanded microbeads are suitable for use, for example, in viscous, flowable, pressure-compensating fitting materials or compositions having a variety of uses and applications. For example, such fitting materials or compositions may be retained within or by flexible closures, and, if desired, may be used in conjunction with (a) footwear, including boots (e.g., ski boots), (b) hand grips, (c) cushioning structures, including devices or applicances which provide protection to parts of the human body by cushioning against pressure, impact or shock, such as athletic and safety equipment, (d) medical devices, including orthopedic and prosthetic appliances, or (e) the like.

The term "flowable," when referring to my finished fitting material or composition, herein characterizes the moldable, shapeable, deformable, or pressure-compensating properties of the finished fitting materials or compositions under conditions or applications of fitting and/or use.

Ski boots presently available generally comprise a relatively rigid outer shell which is typically molded of plastic. Disposed within the outer shell of such boots is an inner member or liner which is relatively soft and flexible, as compared to the shell. The boot also has one or more buckles or other suitable fastening means for selectively opening and closing the boot.

Rear-entry ski boots generally have a pivoting tongue member which pivots outwardly away from the shell to provide a rear, vertically extending opening, which accommodates or facilitates placement of the foot of the wearer into the boot. After the foot is placed into the boot from the rear, the tongue member is pivoted back into its closed position and is secured in place by fastening means, such as one or more buckles and associated fastening loops or cables. It should be noted that each of U.S. Pat. Nos. 3,798,799 and 3,882,561 to Alden B. Hanson and Chris A. Hanson discloses a rear-entry ski boot. The disclosure of each of those patents is hereby expressly incorporated by reference herein and is a part hereof.

Referring to U.S. Pat. Nos. 3,798,799 and 3,882,561 in added detail, those patents disclose rear-entry ski boots having a substantially rigid, plastic outer shell, and a substantially flexible, inner liner (e.g., polyurethane foam) disposed therein. The outer surface of the liner is generally complementary to the inside surface of the outer shell. The inner surface of the liner is adapted to surround the wearer's foot, including the ankle extremities, is contoured substantially to the outer surface of the wearer's foot, and is adapted to be deformed to custom-fit the foot during the special fitting procedure disclosed therein. The liner is shaped and positioned to provide a space of one or more cavities (herein "cavity") between its outer surface and the inner surface of the outer shell, which cavity is adapted to be substantially or significantly filled with a substantially non-compressible, fitting material. The fitting material is inserted into the cavity, preferably during the course of a special custom-fitting and sizing operation, to complete the assembly. Alternatively, the fitting material may be placed in the cavity prior to the fitting operation, and simply rendered flowable during the custom-fitting operation. Although the fitting material is flowable during the special conditions of the fitting operation, thereafter it solidifies or hardens to give firm support and comfort for skiing purposes.

The fitting material, as disclosed in those particular patents, does not provide a padding function, since it is substantially non-compressible during conditions of use. It does provide, however, a support function for the skier's foot and ankle, and firm contact between the foot and the outer shell of the ski boot.

The custom-fitting operation disclosed in U.S. Pat. Nos. 3,798,799 and 3,882,561 is preferably accomplished by injecting flowable, thermoplastic fitting material into the cavity formed between the outer shell and the liner or into a bladder that is positioned in the cavity, with the foot being in place within the liner. The fitting material is heated until it becomes flowable, whereupon it is introduced into the cavity or bladder. The wearer waits for the warm fitting material to cool sufficiently and consequently to solidify or harden to provide a custom-fit to the shape of the foot.

My invention involving the use of my improved, pressure-compensating fitting material differs from the disclosure of those patents, particularly the specific fitting operations and fitting means disclosed therein, in that, among other things, a preformed shaped fitting pad is conveniently used of selected shape and construction, which comprises a flexible, protective enclosure having confined and retained therein a predetermined amount or volume of pressure-compensating fitting material with desired fitting and flow characteristics. The fitting pad (the term "pad", when referring to a fitting pad, may include a plurality of fitting pads) retains the pressure-compensating fitting material and is shaped, constructed, and adapted to be positioned in an ankle-covering boot between the boot and the foot. For example, it is adapted to be positioned between an outer shell and a flexible liner member (the term "liner" includes the use of padding means), so as to substantially or significantly fill the space or cavity provided between portions of the shell and liner member that are directly adjacent to or in direct contact with the fitting pad (in overlying and underlying relationship thereto). The fitting pad is adapted to provide and maintain a snug or firm fitting relationship with the foot of the wearer during conditions of use with a high degree of comfort, as explained in added detail later below.

If desired, the fitting pad may be used in conjunction with conventional front-entry boots (e.g., ski boots) and the boots may be for a variety of uses (e.g., ice skates).

Figure 1:
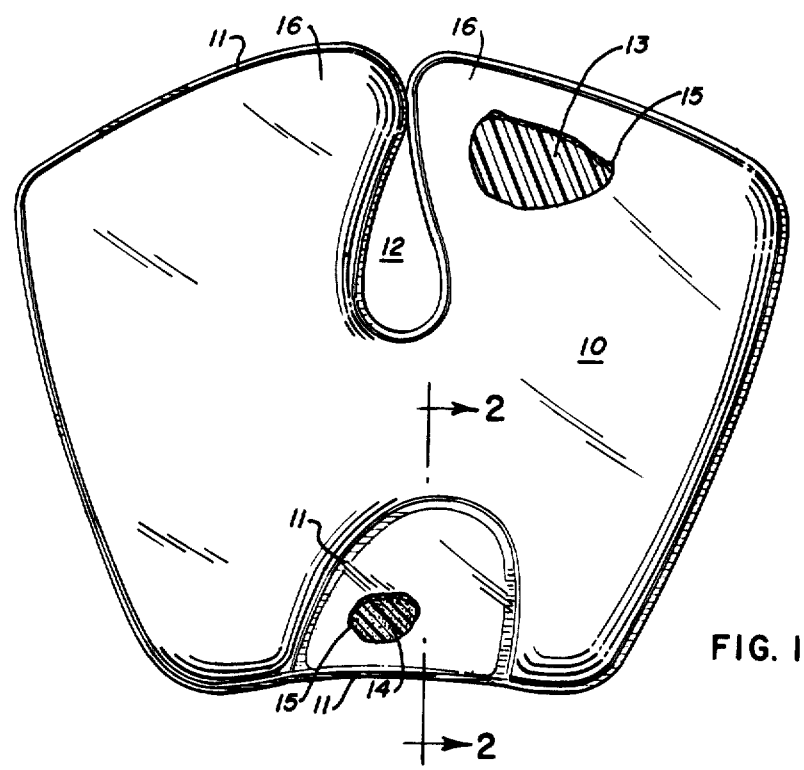
FIG. 1 is a plan view showing an illustrative embodiment of my fitting pad with portions of the enclosure broken away to show its contents.
Figure 3:
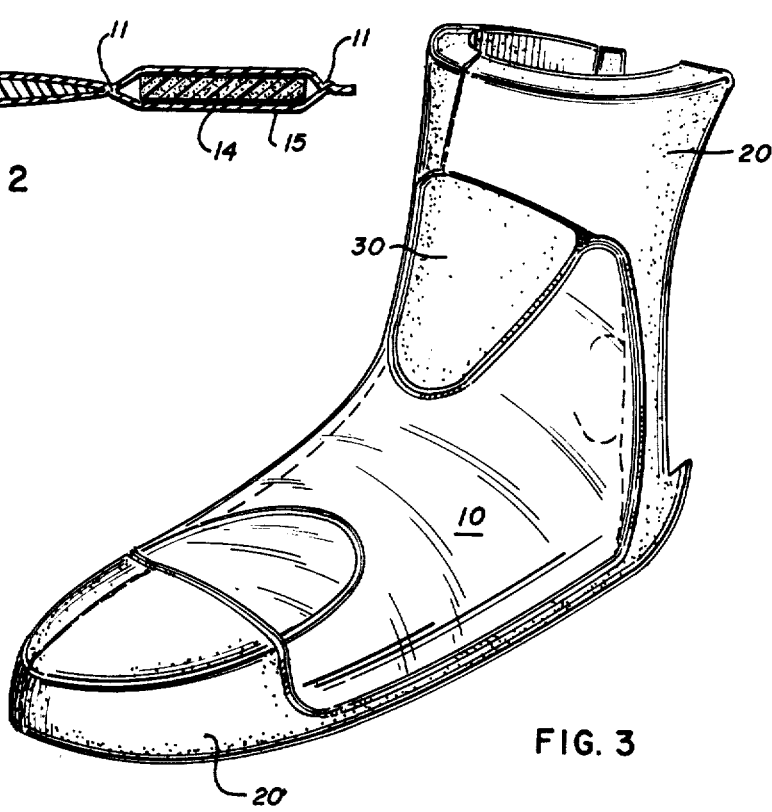
Figure 6:
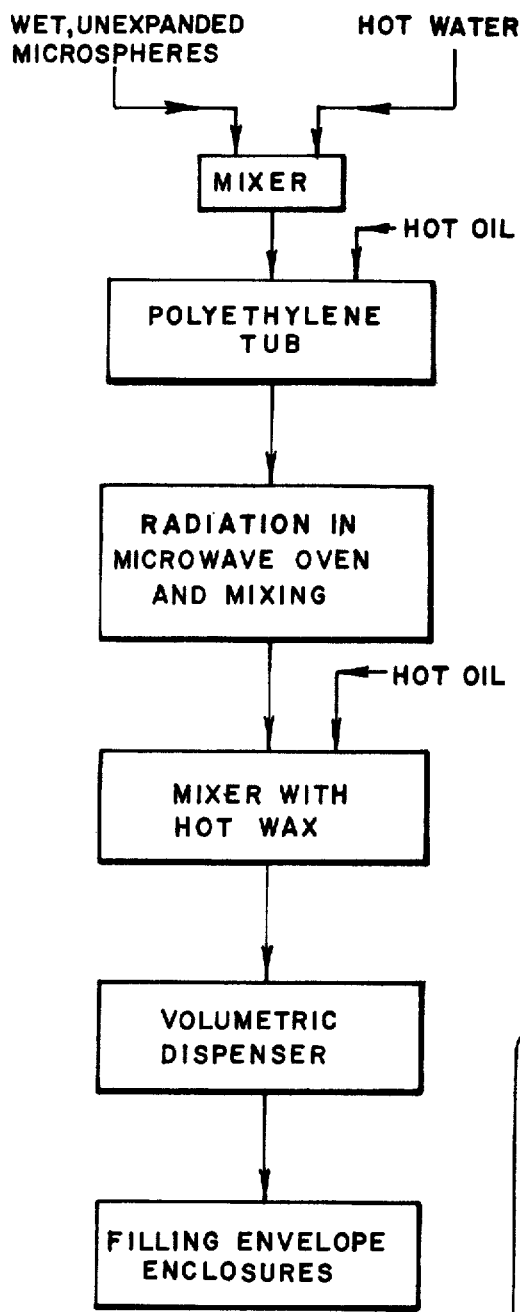
Figure 7:
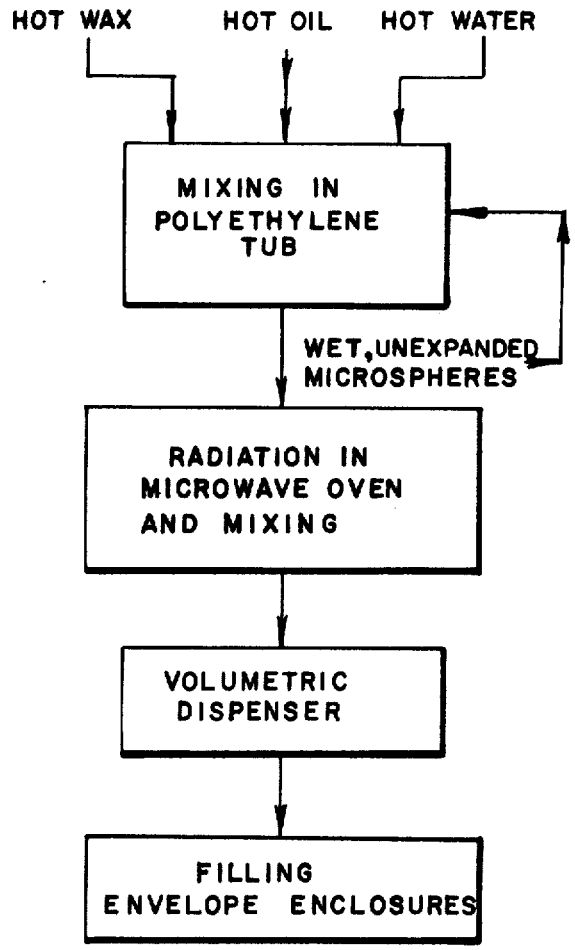
Figure 8:
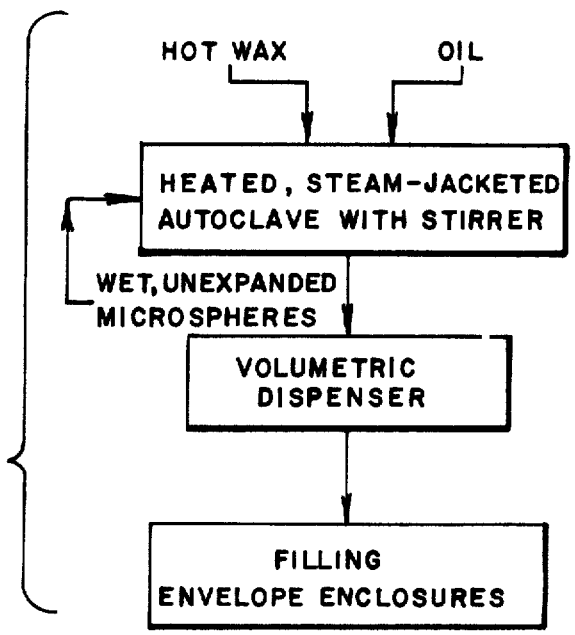

FIG. 3 is a front perspective view showing the fitting pad shown in FIG. 1 positioned in place about selected front and side portions of an illustrative flexible liner member. The assembly shown in FIG. 3 may be positioned, for example, in the semi-rigid, rear-entry, ski boot shell shown in U.S. Pat. Nos. 3,798,799 and 3,882,561;

FIG. 4 is a plan view, similar to FIG. 1, showing a preferred illustrative embodiment of my fitting pad with portions of the enclosure broken away to show its contents;

FIG. 5 is a front sectional view showing the ankle of a wearer positioned within an illustrative ski boot, and showing the outer shell of the boot, the preferred fitting pad shown in FIG. 4 positioned within a cavity, and the flexible liner member shown in FIG. 3; and, FIGS. 6, 7, 8 and 9 are schematic representations generally showing the processes of Examples 1, 2, 3, and 4, respectively hereof. More particularly, FIGS. 6 and 7 relate to the use of high frequency electrical energy.

The shaped, pressure-compensating fitting pad 10 shown in FIG. 1 comprises a flexible, protective, envelope or enclosure with a predetermined amount or volume of pressure-compensating fitting material 13 retained therein. The envelope enclosure is formed of suitable flexible material and desirably is a pliable, thermoplastic resinous film 15 that is heat-sealed. As shown in FIG. 1, the fitting pad 10 is bifurcated and has two upper legs 16 with opposed inner edges which form a tear drop-shaped opening 12. The opening 12 is shaped so as to facilitate the positioning of the upper legs 16 of the fitting pad 10 about the ankle portion of the flexible liner or padding member 20 in the manner illustrated in FIG. 3. If desired, the portion of the fitting pad 10 that joins the lower extremities of the legs 16 and defines the lower portion of the opening 12, may be vertically split (with the adjacent edges sealed) a distance of about 1 inch; however, that modification is not shown in the drawings.

The unitary, preformed fitting pad 10 is shaped so as to be positioned over selected front and side portions of the foot and the flexible liner or padding member 20, as shown in FIG. 3. More particularly, FIG. 3 shows the fitting pad 10 placed upon an inner flexible liner or padding member 20. The inner surface of the liner or padding member 20 is contoured substantially to the outer surface of a wearer's foot. The liner or padding member 20 and overlying fitting pad 10 are positioned in place in a substantially rigid, outer ski boot shell (see the outer shell 50 shown in FIG. 5) of appropriate size, so that the fitting pad 10 significantly or substantially fills the space or cavity (the term "cavity" means at least one cavity) between the shell and flexible liner or padding member 20. When the foot of the wearer simply is placed in the boot, the pressure-compensating fitting material 13, although very viscous, flows at ambient temperature to conform to the contour or shape of the foot and continues to essentially fill the space or cavity, thereby providing and thereafter maintaining a snug or firm, but comfortable, fit without requiring the use of other special fitting operations. As explained later below, that fit is properly maintained during conditions of use.

The particular fitting pad 10 illustrated herein also includes a separate flexible or resilient, lower tab or spacer cushion 14 (see FIGS. 1 and 2), which is retained in place within a separate enclosed portion of the fitting pad, but in separately sealed relationship with respect to the fitting material 13. The lower tab or resilient cushion 14 provides desired pressure relief during skiing at a region of the foot where the use of fitting material 13 is not desired for reasons of comfort. The lower tab 14 may be formed, for example, of foamed, cross-linked polyethylene, such as a L-200 Series Minicell product, supplied by Hercules Incorporated, having, for example, a thickness of about ¼ inch and a density of about 2 lbs./ft.³

Figure 2:
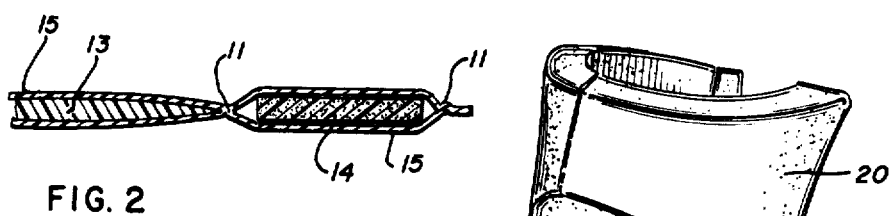
FIG. 2 is a fragmentary cross-sectional view taken along the line 2—2 of FIG. 1.

The fitting material 10 and tab 14 are shown in FIGS. 1 to 3 sealed (e.g., heat-sealed) in place and separated along the sealing lines 11.

FIG. 3 also shows a separate flexible or resilient, upper spacer tab or cushion 30 which simply may be separately positioned in place against the outer surface of the liner or padding member 20 in the region provided by the U-shaped opening 12 of the fitting pad 10. That upper tab or resilient cushion 30 serves essentially the same purpose and is used for essentially the same reasons as the lower tab or cushion 14. The tab 30 may be formed, for example, of foamed polyurethane, may have a uniform thickness of about ⅛ inch to about 0 inch, or may be tapered along its essentially vertically extending length to provide a tapered thickness varying from about ¼ inch, at its thickest portion, to about ⅛ inch, at its thinnest portion.

Although not shown in the drawings, the upper spacer tab or cushion 30 may be an integral part or projection of the flexible liner member 20.

The fitting material 13 is initially distributed substantially uniformly throughout the confines of its envelope closure, and may be provided by sealing (e.g., heat-sealing) the thermoplastic film 15 along the marginal edges or sealing lines 11. A second, separate envelope closure portion is shown maintaining the tab 14 in place adjacent the envelope closure for the fitting material. That second envelope closure is formed by sealing (e.g., heat-sealing) separate sheets of the film 15 along the sealing lines 11.

In one illustrative mode of constructing the fitting pad 10, suitably molded or shaped, essentially flat, fitting material (see Example 5, below) having a substantially uniform nominal thickness of about 0.01 inch to about 0.6 inch and lower flexible tab 14 are placed in spaced-apart relationship between two conforming flexible or pliable sheets or films 15 of thermoplastic resin, which, when entirely sealed, provide a protective envelope closure [e.g., a thermoplastic polyurethane film having a thickness of about 0.011 to 0.015 inch and Durometer hardness (Shore A Scale) of about 85, such as MP-1880 film supplied by Stevens Elastomeric & Plastic Products, Inc., a subsidiary of J.P. Stevens & Co., Inc., Easthampton, Mass., which is a film having a typical tensile strength at 300% stretch of 2,580 psi., typical tensile strength at break (ultimate) of 7,251 psi., typical elongation at break of 440%, typical elongation set of 14.2%, and typical tear strength (Die C) of 351 psi.; or a polyester-based thermoplastic polyurethane film known as "Tuftane" TF-310, sold by B.F. Goodrich General Products Company, Akron, Ohio]. (The polyurethane MP-1880 film mentioned above is elastomeric in that it has memory and tends to at least in part slowly recover upon release of stress that temporarily stretches it.) The two sheets of film 15 are connected by being securely heat-sealed together, so as (a) to seal and retain in place the fitting material 13 within the envelope closure formed between the sheets, and (b) to seal and retain in its proper place the foamed polyethylene tab 14. The pressure-compensating fitting pad 10 is then ready for use, for example, in a rear-entry ski boot.

If desired, one may choose to first heat-seal the protective closure for the fitting material, but leave a small vent opening and a small filling port (not shown), so that a predetermined amount or volume of hot flowable fitting material may be injected into the envelope closure through the filling port, followed by heat-sealing both the vent opening and filling port.

FIG. 4 shows a preferred form of fitting pad 40 comprising a flexible, protective enclosure which maintains a predetermined amount or volume of substantially uniformly distributed fitting material 43 therein. Pad 40 is adapted to be used in ski boots in essentially the same manner as the fitting pad 10 shown in FIGS. 1 to 3.

Referring to FIG. 4 in added detail, the shaped, pressure-compensating fitting pad 40 comprises a flexible, protective, envelope or enclosure with a predetermined amount or volume of pressure-compensating fitting material 43 retained therein. The envelope is formed of suitable flexible material and desirably is a pliable, thermoplastic resinous film 45 that is heat-sealed. The film 45 may be formed of the same resinous materials and products described above with respect to the film 15 of the fitting pad 10. The fitting pad 40 has two, upper legs 49 with opposed inner edges which form a tear drop-shaped opening 42. Opening 42 is shaped so as to facilitate the positioning of upper legs 49 of the fitting pad 40 about the ankle portion of the flexible liner or padding member 20 in a manner similar to the opening 12 of the fitting pad 10 (illustrated in FIG. 3).

The particular fitting pad 40 illustrated herein also includes a separate, flexible or resilient, lower tab or spacer cushion 44, which is retained in place within a separate enclosed portion of the fitting pad, but in separately sealed relationship with respect to the fitting material 43. The lower tab or resilient cushion 44 provides desired pressure relief during skiing at a region of the foot where the use of fitting material 43 is not desired for reasons of comfort. The lower tab 44 may be formed, for example, of polyvinyl chloride foam having a uniform thickness of ¼ inch and density of about 8 to 9 lbs./ft.³, such as polyvinyl chloride memory foam sold by Blanchard Industries, Inc., West Orange, N.J.

As shown in FIG. 4, the upper face or layer of the film 45 has a hole 46 (e.g., about 3/16 in. in diameter) therethrough in that portion of the closure which separately retains the lower resilient tab 44. A second similar hole (not shown) is similarly positioned in the opposed underlying face or layer of the film 45. Those holes provide means for air to escape from the resilient tab 44 and the envelope closure which retains it.

In forming the fitting pad 40, the tab or spacer cushion 44 is sealed in place, and the envelope closure is sealed along the sealing lines 41, except for the open filling and venting ports 47 and 48 shown in broken lines in FIG. 4. A predetermined amount or volume of hot flowable fitting material 43 is inserted into the confines of the envelope enclosure through the filling and venting ports 47 and 48. Thereafter, each of the ports is sealed (e.g., heat-sealed) along the sealing lines 41, so as to entirely close the fitting pad 40, and, if desired, is cut from the fitting pad 40 and discarded.

FIG. 5 is a sectional view showing a foot 51 fitted within a ski boot in which the preferred fitting pad 40 is positioned in the cavity provided between the outer shell 50 of the boot and flexible liner or padding member 20. The fitting pad 40 is positioned in the boot in a manner such that it covers the sides of the ankle, whereby the fitting pad 40 confines the ankle extremities of the foot.

The pressure-compensating fitting materials 13 and 43, referred to above, are preformed and retained in readily removable and replaceable, sealed, flexible, pliable envelope enclosures or bladders that cover or enclose them, to provide fitting material in the form of separate, removable, replaceable pressure-compensating fitting pads 10 and 40.

The fitting material sealably contained within the fitting pad, although viscous, flows under controlled pressure conditions during fitting and conditions of use, so as to snugly or firmly, but comfortably, fit or conform to the shape of the foot when the foot is placed in the boot, and, subsequently, during skiing or other activities. At the same time, the fitting pad provides effective means for filling the cavity between the (1) adjacent or overlying, semi-rigid outer shell and (2) adjacent or underlying, substantially flexible liner and/or the foot. The flexible liner has an inner surface contoured substantially to the outer surface of the foot.

The retained pressure-compensating fitting material 13 and 43 is formable, will conform or deform to an irregular shape, will substantially retain that shape when relieved of pressure, and will not "sag" or slump significantly or noticeably upon storing at ambient temperatures. The fitting material provides positive foot control for the wearer. The shape of the fitting material may be changed by the application of continuously applied pressure or shear stress that exceeds some desired minimum level. After the yield point of the fitting material is reached, it flows under shear stress. In this respect, the fitting material responds in a manner generally expected of a liquid. When the fitting material is confined, for example, within an envelope enclosure and when the resultant pad is confined, for example, in a boot, during conditions of use the fitting material is resistant to flow in response to instantaneously applied pressure. Furthermore, appropriately positioned fitting material does not tend to flow away from those portions of the foot which require support or to flow out of desired locations to provide an uncomfortable fit.

The retained fitting material may have, for example, a nominal thickness of from about 0.01 inch to about 0.6 inch, depending on the particular application or needs of the user.

Placement of the above-described fitting pad within the boot is readily accomplished by positioning it about the sides (including the sides of the ankle) and, if desired, at a selected front portion of the foot and/or at the back of the ankle. The fitting pad should be located or positioned about the foot at areas of the foot best able to withstand, as well as needing, its important and distinctive fitting and pressure-compensating characteristics. Upon closing or tightening of the boot, the fitting material will flow or deform during desired conditions of use to conform to the shape of the foot and flexible liner member covered by the fitting pad and to provide and maintain firm support, a good fit and a high degree of comfort in the vicinity of the foot covered by the fitting pad.

Fitting pads may be positioned in a variety of footwear or boots that cover the ankle or even footwear that does not cover the ankle, and is not limited to use in rear-entry boots or even ski boots or footwear.

The term "cavity," as used herein, includes what may be termed as being a plurality of cavities. Preferably, the cavity surrounds or overlies selected major portions of the front and side areas, including the ankle area, of the wearer's foot. Furthermore, with respect to boots that do not provide rear entry, the cavity and fitting pad may, if desired, extend to or around the rear of the foot.

When used in boots, the pressure-compensating fitting pad is preformed in the sense that it is contemplated that it be placed or installed in the boot, or at least be made ready for such placement or installation, at the factory or prior to fitting the boot on the wearer. Therefore, no special custom-fitting operation or conditions are initially required, other than simply to place the foot of the wearer into a boot of appropriate size. During manufacture, a predetermined amount or volume of fitting material may be placed in an appropriate flexible enclosure which is sealed to provide a pressure-compensating fitting pad of a predetermined size, configuration and thickness appropriate for a particular size and style of boot or footwear. As explained above, by placing the foot into an appropriate boot, the fitting material undergoes sufficient flow within the sealed envelope to allow the fitting pad to conform substantially to the underlying shape or position of the wearer's foot, whereby a snug or firm, but comfortable, fitting is achieved and maintained.

The envelope enclosure may be formed of a variety of flexible and pliable materials that provide a protective barrier for the fitting material sealably contained therein, and which are substantially impervious to the flow or seepage therethrough of necessary or essential constituents or components of the confined finished fitting material. However, the barrier material may not be, and often is not, entirely impervious to the escape or transmission therethrough of volatile liquids, such as any residual water that may be present in the fitting material. If the closure is formed, for example, of a synthetic resinous film, the film should be flexible both at ambient room temperatures and at temperatures of use, which for ski boots is at least as low as about $-20°$ F.

In selecting the barrier material for the enclosure, it should be kept in mind that its thickness, surface hardness, flexible and resilient characteristics may affect the "feel" of the fitting pad and the response of the retained fitting material to various conditions of use. Consequently, great care should be used in its selection.

When the sealed envelope enclosure is formed, for example, of somewhat resilient or elastomeric material 15 and 45, the fitting material 13 and 43 confined therein tends to slowly and at least in part recover (during conditions of use) upon release or relief of deforming pressure. Moreover, the flow and recovery of the finished fitting material is responsive to forces applied and/or relieved during fitting and/or conditions of use.

Although I prefer to use my pressure-compensating fitting material within an enclosure member so as to provide a separate pad, if desired, one could, for some special purposes, also insert the fitting material, without a separate enclosure, into a suitable confining cavity formed by the shell and liner member of a boot (e.g., ski boot).

Further referring to my confined fitting material, it is a thermoplastic composition. It provides controllable pressure-compensating support. It has a low specific gravity (e.g., in the vicinity of about 0.8, preferably less). It is flowable (during fitting and conditions of use) about the adjacent or underlying portion of the foot so as to be capable of essentially assuming or conforming to or snugly or firmly fitting its shape to that of the foot in an effective, but comfortable, manner. It gives desired firm support and comfort for skiing or other intended purposes. It is a viscous material, and may be considered as being highly viscous, and does not significantly or substantially change in volume responsive to ambient temperatures or ambient temperature changes. When heated, the fitting material is sufficiently flowable to be conveniently handled (e.g., pumped) for further processing operations. It may advantageously have a nominal thickness, for example, within the range of about 0.01 inch to about 0.6 inch, depending on the purpose and conditions of use (e.g., the space which defines the thickness of the space or cavity between the shell and the flexible liner member of the boot and the foot). When confined, during conditions of use it is resistant to flow in resonse to instantaneously applied pressure. It flows in response to continuously applied pressure to provide some pressure on portions of the foot that can best withstand it and to allow portions of the foot to at least momentarily move away from pressure. Under conditions of use and when confined within an enclosure, it is virtually resilient in the sense that it is momentarily or slowly, at least partly recoverable, as opposed to being instantaneously recoverable, upon release or relief of pressure loads that cause it to deform; such resistance to rapid recovery generally is preferred. For example, at least partial recovery after deformation may take place within the time span of about 0.25 to about 20 sec., which is considered herein as being "slowly" recoverable since the fitting material recovers slower than would the resilient, expanded microbeads alone.

The confined fitting material undergoes flow and deformation away from the areas of highest pressure. For example, this occurs when the fitting pads are positioned in the boots and the boots are being fitted, and for a brief period immediately thereafter. That is, the fitting operation produces a mass displacement of some of the fitting material to accomodate the shape of the foot and to equalize the pressure throughout the fitting pad.

Another type of deformation occurs as a result of the added forces which are incurred, for example, during skiing, whereby the foot is forced against the boot to turn the ski, or the ankle is flexed forward or backward to compress part of the flexible liner member. This type of deformation (e.g., the liner member and fitting pad), which is essentially compressive in nature, is essentially or at least in part recoverable upon relief of the deforming forces or pressure.

The finished fitting material is substantially homogeneous at room temperature and remains substantially homogeneous (i.e., is substantially stable) in that, for example, it does not separate into different phases under normal storage conditions or temperatures, or at temperatures or under conditions of intended use. The components or ingredients of the finished fitting material must not chemically interact or react with or attack each other or the associated closure member in a destructive manner. Furthermore, the finished fitting material should significantly resist substantial change of the desired flow characteristics under conditions or temperatures of use. It is appreciated, however, that many fitting materials tend to stiffen or harden at low temperatures, but, for low temperature use, such variations should be kept to an acceptable minimum. Accordingly, when the fitting material is used in conjunction with ski boots or the like, the fitting material should have sufficient stability and desired pressure-compensating flow characteristics at low temperatures.

Furthermore, it is important, for many, if not most, uses that the specific gravity of the finished fitting material be in the vicinity of about 0.8, preferably less.

The finished fitting material essentially consists of a compatible combination of a major amount or proportion of wax and oil, and a minor amount or proportion of lightweight, sturdy microbeads (e.g., thermoplastic, resinous, resilient hollow microbeads). The substantially homogeneous blend or mixture of wax and oil is coherent and not crumbly, and is viscous, flowable and substantially homogeneous, and constitutes the predominant and continuous phase and the microbeads are substantially uniformly distributed or dispersed therethrough as a discontinuous phase of micro-size. Those components may be introduced into the fitting material and blended as separate and distinctly different components, or at least some amount of one or more of those components may be introduced into the fitting material in suitable premixed or physically combined forms.

Since water generally increases the specific gravity of the finished fitting material, and does not serve any functional or necessary purpose, as such, in the finished fitting material, it is very desirable that if it is present in the finished fitting material, that it not be present in amounts or levels that exceed tolerable, minimal or residual levels (e.g., up to or not exceeding about 8% by weight, preferably up to or not exceeding about 3% or about 5% by weight). Accordingly, the finished fitting material may have a specific gravity, for example, of from about 0.15 about 0.8, preferably from about 0.3 to 0.5.

For some purposes, advantageous results may be achieved by also including a thickening agent in the finished fitting material, such as oil-soluble soaps (e.g., sodium palmitate, zinc stearate or aluminum stearate).

Excluding the microbeads present in the finished fitting material, the remaining materials or components (e.g., wax and oil) must be present in amounts sufficient (a) to more than merely thinly coat substantially the entire outer surface of essentially each of the microbeads (e.g., expanded microbeads) or (b) to more than merely form a film over the surface of essentially each of the microbeads (e.g., expanded microbeads). The combined volume of those other blended materials or components (e.g., wax and oil) must be significantly or substantially more than the volume of the interstitial spaces of the quantity of microbeads (e.g., expanded microbeads) alone. That requisite volume relationship may be estimated or determined by mathematical calculations or experimental means.

Referring next to the compatible (a) wax, (b) oil and (c) lightweight sturdy microbeads, in that order, the wax component, for example, may be suitable natural, mineral, petroleum-based, synthetic, vegetable, or animal wax (includes insect wax), such as beeswax [e.g., SC 10979 beeswax (yellow), supplied by Sargent-Welch Scientific Co., Skokie, Ill.], paraffin wax, or microcrystalline wax.

The wax component, although deformable under pressure, is substantially incompressible, as such, and is an essentially non-flowable solid at temperatures below about 110° F., but softens and flows at higher temperatures.

Particularly good results have been obtained with microcrystalline wax. Microcrystalline wax is a mixture of solid hydrocarbons derived from petroleum. More particularly, it is a mixture of alkylated naphthenes (saturated cycloparaffins) and isoparaffins (branched chains) with varying amounts of normal paraffins (straight chains). Microcrystalline waxes generally have an average molecular weight of about 580 to 700, although in some instances the molecular weight may be as high as about 900 with individual molecules having from about 30 to 60 carbon atoms. The molecular weight of paraffin wax generally is much lower, usually ranging from about 260 to 420 and having individual molecules varying from about 20 to 30 carbon atoms. As the name implies, microcrystalline wax refers to the crystalline size when in the solid state, and has crystals that are much smaller than those of paraffin wax (sometimes referred to as macrocrystalline wax). Microcrystalline wax generally has good low temperature flexibility, adhesion and excellent resistance to moisture penetration under conditions of stress and strain, and, therefore, generally is preferred over paraffin wax, particularly when the finished fitting material is used in boots for use at low temperatures (e.g., ski boots).

In preparing finished fitting material for use with ski boots, outstanding results are achieved using HM-1319 wax, a microcrystalline wax-based, hot melt adhesive product formulated and supplied by H B Fuller Company, St. Paul, Minn. That wax product is light yellow, has a typical "application" temperature of 180° F. to 200° F., and has a typical ring and ball softening point of 174° F. to 176° F. It essentially consists of 85% by weight of microcrystalline wax, and 15% by weight of "Tufflo" 6204 oil. "Tufflo" 6204 oil, supplied by Atlantic Richfield Company, is a technical grade naphthenic-type white mineral oil having the following typical properties:

| | |
|---|---|
| Viscosity | |
| 100° F., S.U.S. | 1750 |
| 210° F., S.U.S. | 91 |
| Gravity, ° A.P.I. | 23.4 |
| Specific Gravity 60/60 | 0.9135 |
| Density, lbs./gal. | 7.61 |
| Color, Saybolt | +20 |
| Flash Point, ° F. | 465 |
| Pour Point, ° F. | +15 |
| Aniline Point, ° F. | 232 |
| Refractive Index, 20° C. | 1.4945 |
| Viscosity Gravity Constant | 0.840 |
| Molecular Weight | 490 |
| % Volatility, 22 hrs./225° F. | 0.3 |
| U.V. Absorptivity, 260 mµ | 0.2 |
| Acid No. | 0.0 |
| Aromatics, % | 14 |
| Saturates, % | 86 |
| Distillation, ° F. | |
| I.B.P. | 620 |
| 5% | 745 |
| 50% | 880 |
| 95% | 1020 |

Furthermore, good results have been achieved preparing finished fitting material for use in ski boots using a wax product formulated and supplied by Leisure Research, Inc., U.S. Ski Wax Division, essentially consisting of 85% by weight of microcrystalline wax, 10% by weight of "Carnea" 21 oil, and 5% by weight of glycanol, a plasticizer. "Carnea" 21 oil, supplied by the Shell Oil Company, is a grade of mineral oil with a low viscosity index and has a low natural pour point, and, more particularly, has a typical viscosity, S.S.U., of 105 at 100° F. and 38 at 210° F., a typical flash point of 325° F., and a typical pour point of −30° F.

The added oil component of the fitting material may be a suitable natural, synthetic, vegetable, or petroleum-based oil (neutral blending or bright stock). In order to facilitate control of the flow characteristics of the finished fitting material, it is important not to use unsaturated natural or vegetable drying or semi-drying oils that are unsaturated in such a manner or to such a level as to oxidize, thicken or harden significantly (e.g., polymerize or cross-link) with time or conditions of storage or use, which in many instances is reflected by the oil having an excessively high or unsatisfactory iodine number.

The oil component, for example, may comprise petroleum-based oil, such as "Carnea" 21 oil, "Tufflo" 6204 oil, "Topco" Motor Oil, S.A.E. 20 (supplied by the King Super Market, Boulder, Colo., or suitable admixtures thereof. Moreover, if desired, vegetable oil, such as coconut oil (e.g., SC 11518 coconut oil supplied by Sargent-Welch Scientific Co., Skokie, Ill.), may be used, at least for some purposes.

Referring next to the lightweight microbeads, a variety of kinds and types of microbeads may be used; however, I prefer to use hollow, resilient, polymeric and synthetic resinous materials, particularly thermoplastic materials, which may be expanded from a granular or bead form to assume a monocellular, solidified foam-like structure by the action of various agents for expanding or blowing the materials, as disclosed, for example, in U.S. Pat. No. 3,615,972 to Morehouse et al. That patent is expressly incorporated by reference herein.

By using beads of a micro-size, the resistance to flow of the fitting material tends to increase, thereby facilitating slower recovery, and sturdier lightweight beads are provided as a result of their small size.

The blowing agents, in accordance with common practice, are usually gases (or gas-generating substances) or highly fugacius liquids which have been intimately incorporated within an unexpanded particulate form (e.g., granules or beads) of thermoplastic resinous material. The application of heat to an unfoamed or unexpanded particulate form of the thermoplastic resinous material containing a volatile fluid blowing or expanding agent causes the agent to be thermally expanded or released, or both, while the particulate material is attaining an elevated blowing or foaming temperature at which it is sufficiently heat-softened and yieldable to permit the pressure exerted by the thermally expanding blowing agent to expand it substantially into the desired foamed or expanded, hollow, low density structure of micro-size. The loss of the blowing agent from the microbeads prior to their being heat-expanded is undesired, since it deters from the later-desired, essentially full or fuller expansion of the microbeads.

The heat energy which is required to soften the resinous material and release or activate the blowing or expanding agent for the foam-forming function is conventionally derived from an external source. Consequently, steam, hot air, an oil bath, and other conventional heat-generating or supplying means generally are employed for the purpose of heat-expanding or foaming a plurality of discrete expandable particles of the thermoplastic material.

The art also mentions expanding certain polymeric materials under certain conditions by applying heat hereto using high frequency electrical energy. For example, in U.S. Pat. No. 3,711,430 to Rubens, expandable granules of an $\alpha$-olefin-$\alpha,\beta$-monoethylenically unsaturated carboxylic acid copolymer having entrapped organic blowing agent are heated rapidly by being subjected to a high frequency electrical field. Moreover, U.S. Pat. No. 2,998,501 to Edberg et al. discloses using high frequency waves to transfer energy to expandable polymeric materials (e.g., polystyrene) in such a manner that the electrical energy is immediately converted to thermal energy. The heat produced purportedly results in an almost instantaneous expansion of the polymeric material to produce an integral, cellular, low density structure having small, uniform voids. British Pat. No. 922,547 discloses a process for heat-expanding polymers (e.g., polystyrene or polyvinyl chloride) containing a foaming agent, which involves generating heat within the granules by subjecting them to a high frequency alternating electric field as the granules are advanced on a conveyor belt. The polymer granules may include material having a higher power factor than the polymer, so as to enhance the heating and shorten the heating time of the polymer granules.

Referring again to U.S. Pat. No. 3,615,972 to Morehouse et al., but in added detail, it relates to thermoplastic resinous particles, granules or beads of a micro-size having encapsulated therein at least one liquid body comprising a volatile blowing or expanding agent. The microbeads are capable of expanding, when required, into distinct or discrete micro-particles having expanded single cells. The hollow, unexpanded, but expandable, micro-particles have a shell having an outer surface and an inner surface. Confined within the inner surface is a cavity with a liquid blowing agent which fills a majaor portion of the cavity. The expanded particles are formed by heating the unexpaned or only partly expanded micro-particles to a controlled temperature sufficiently high to permit heat-softening of the polymeric shell wall and to vaporize or volatilize at least a portion of the blowing or expanding agent sufficiently, so as to provide adequeate pressure internally which deforms outwardly the heat-softened shell without melting or destroying the hollow shell or fusing together a plurality of micro-particles and without puncturing or forming blowholes in the shell or breaking or rupturing the shell or causing it to collapse. On cooling of the integral, continuous shell, the thermoplastic resinous material no longer deforms as a result of such expansive action of the blowing or expanding agent, and it generally retains its increased dimension and does not thermally collapse.

The liquid blowing or expanding agent is essentially nonreactive with or a nonsolvent for the thermoplastic polymeric material. The quantity of blowing agent present in the unexpanded particles, for example, may be in excess of that which is soluble in the polymer. A wide variety of blowing agents may be used, including volatile fluid-forming or liquefied agents such as aliphatic hydrocarbons having a molecular weight of at least 26 and a boiling point below the range of the heat-softening point of the resinous material when the material is saturated with such blowing agents.

U.S. Pat. No. 3,615,972 states that generally the expansible particles or beads have a diameter, for example, of between about 1 micron to about 50 microns, and, advantageously, between about 2 microns and about 20 microns.

The expanded microbeads have an excellent thermal insulative value, and good structural strenght under normal loads.

Referring next to my preferred discrete, expanded, hollow, monocellular, generally spherical polymeric particles, microbeads or microspheres, they are prepared by providing a plurality of readily heat-expandable, thermoplastic, synthetic resinous particles or beads having a generally spherical shape and micro-size, and having encapsulated or entrapped generally concentrically within the hollow shell as a generally spherical occulusion or nucleus, a distinct and separate liquid phase essentially consisting of a volatile, organic liquid expanding or blowing agent, such as a low boiling hydrocarbon or other volatile liquefied material which generally is a non-solvent for the polymer. The expanding agent vaporizes or becomes gaseous at a temperature generally below the thermoplastic softening point or heat-plastification point or temperature of the polymeric shell. The polymer generally becomes heat-softened or heat-plastified at a temperature below the thermoplastic temperature of the particles. Moreover, the shells exhibit resistance to many solvents and should not be significantly attacked by the other necessary components of the fitting material.

The preferred unexpanded microbeads are distributed or dispersed throughout a liquid medium and heated to a temperature sufficient to cause heat-plastification or heat-softening of the polymer shell and volatilization or vaporization of the expanding agent, thereby expanding the microbeads due to the expanding force exerted by the blowing agent, to form a plurality of discrete, expanded, monocellular, hollow, generally spherical shells. It is desirable that the microbeads be substantially or essentially fully expanded; however, when expanded properly, the expanding temperature and force must be insufficient to cause the shells to melt or to be fused together, to collapse, to rupture or to be punctured, to be broken, or to be significantly weakened. Accordingly, the structural integrity of the individual microbeads should be maintained. It is important that the expanded microbeads be resistant to thermal collapse. It is desirable that such microspheres be readily expandable at temperatures close to or at the vicinity of the prevailing boiling point of water. After heat-expansion, the particles are cooled, thereby providing sturdy, resilient, hollow, monocellular expanded microspheres, which will flex or bend, but not rupture or break, under reasonable loads (e.g., loads encountered during use of the expanded microbeads in fitting material), and which have diameters substantially or several times larger (e.g., about 2 to 6 times larger in diameter) than the unexpanded, but expandable, particles. For example, unexpanded microspheres having an average diameter of about 6 to 8 microns may be expanded to diameters averaging about 25 to 30 microns, or more.

The unexpanded microbeads may have a diameter of between about 2 to 100 microns or about 2 to 50 microns, generally between about 2 to 20 microns or about 2 to 10 microns.

For example, the average diameter of the unexpanded microspheres may fall within the range of about 4 to 12 microns, and the diameters of such microspheres may fall within the range of about 2 to 30 microns. The bulk density of the unexpanded microspheres may fall within the range of about 35 to 55 lbs./ft.$^3$, and the true density may fall within the range of about 70 to 95 lbs./ft.$^3$ However, following expansion of the microspheres, the average diameter of the expanded microspheres may be, for example, as much as about 20 to 50 microns, and the diameters of such expanded microspheres may be, for example, as much as about 5 to 150 microns. The bulk density of the expanded microspheres may be as low as about 0.65 to about 5 lbs./ft.$^3$, and the true density may be as low as about 1 to 10 lbs./ft.$^3$ I prefer that the bulk density of the expanded microspherres approach or be in the vicinity of about 1 lb./ft.$^3$, or lower, and the true density approach or be in the vicinity of about 1 to 10 lbs./ft.(the lower the better).

It is particularly desirable that the expanded microbeads present in my finished fitting material be resilient and strong under conditions of use, and preferably provide fitting material having, under conditions of use, resistance to rapid recovery (i.e., provide for slow recovery, as opposed to instantaneous recovery) upon or following release or relief of pressure loads causing deformation (e.g., provide for recovery of the confined fitting material within a time interval of about 0.25 sec. to about 20 sec. after deformation).

Although I prefer that the shell of the expanded microbead be generally spherical (i.e., microspheres), it may be of other suitable resilient micro-shapes or microforms.

Furthermore, for certain selected purposes and conditions, combinations of different kinds and types of microbeads may be satisfactorily used and distributed in my fitting material, and each kind or type of microbead so-used may advantageously impart different desired characteristics to the fitting material under particular conditions of intended use.

If desired, in preparing my fitting material, one may choose to use or distribute satisfactorily therein, for certain purposes and conditions, various lightweight sturdy microbeads which may not be hollow, resilient, polymeric or resinous, and/or of an expanded form, such as glass microbeads or solid or non-resilient or thermosetting resinous microbeads, but such microbeads generally are not preferred for use in my fitting material.

I have discovered that it is particularly advantageous to expand microbeads by subjecting them in situ to heat induced by controlled high frequency electrical energy [i.e., dielectric and microwave heating using RF (radio frquency) energy].

The term "in situ," when herein referring to expanded microbeads used or present in finished, pressure-compensating fitting material, concerns or may embrace heat-expanding the expandable microbeads in liquid media having at least some of one or more of the other functionally necessary or essential components of the finished fitting material (e.g., wax and/or oil). Such liquid media may or may not include or comprise other material(s) (e.g., water) or an undesired level thereof, which is substantially or essentially removed or at least significantly reduced prior to completion of the production of the finished fitting material, thereby entirely removing such other material(s) or providing in the finished fitting material only a tolerable, residual or trace level thereof.

Since (a) unexpanded microbeads such as exemplified by expandable "Saran" Microspheres XD-8217 are sold and conveniently handled in a water-moistened or wet form, (b) those particular microspheres have a typical expanding or foaming temperature of about 90° to 120° C., and (c) completely drying those microspheres prior to heat-expansion may not be desired, the term "in situ," when used to include or refer to the heat-expansion of such microspheres involving subjecting them to high frequency electrical energy in an appropriate system, may embrace the use or presence in the system of even more water than is typically present in the purchased form of such wet microspheres (water is an unnecessary and, in high levels, even an undesired component of the finished fitting material), even though the amount of water ultimately present in the finished fitting material should not exceed tolerable, minimal or residual levels of a much lower order. Furthermore, the term "in situ," when used to include or refer to such expansion with high frequency electrical energy, may also include the use or presence in the system of an appropriate amount of oil and/or wax.

When the term "in situ" expansion of microbeads is not limited or used herein to refer to heat-expansion of microbeads to be incorporated or present in pressure-compensating fitting material, that term may include or embrace heat-expanding the microbeads using high frequency electrical energy and a system wherein such expansion is conducted in the presence of a variety of suitable or desired liquid media or vehicles which may or may not be present or used in a fitting material.

Water has no functional purpose, as such, in the finished fitting material, although it may be present therein. Consequently, it unnecessarily and generally undesirably increases the overall density and specific gravity of the finished fitting material. Furthermore, it tends to evaporate from the sealed enclosure with the passage of time, thereby undesirably lowering the predetermined, controlled volume of the fitting material initially present in the sealed envelope closure. However, when heat-expanding the hollow unexpanded microbeads in situ using high frequency electrical energy, the hot, escaping vaporized water helpfully tends to enshroud and dilute volatilized blowing agent which has permeated through the shell walls of the microbeads, and, with "Saran" Microspheres XD-8217, some liberated, volatilized vinylidene chloride, which may escape from the immediate confines of the heated system.

"Saran" Microspheres XD-8217 product, supplied by The Dow Chemical Company, is a preferred form of microbeads and is composed of a thermoplastic polymer shell of vinylidene chloride and acrylonitrile (e.g., a copolymer of vinylidene chloride and acrylonitrile) with a nucleus of a thermally-responsive, encapsulated, liquefied blowing or expanding agent, namely, isobutane. The unexpanded micro-spheres are supplied in a wet cake form having about 65% by weight microspheres on a dry basis in about 35% by weight available water. The presence of water facilitates the handling of the microspheres, since they readily freely float into the environment (e.g., atmosphere) to provide hazardous fine dust that is difficult to control. However, the blowing agent retained with the microspheres is more volatile than the water.

The application of heat softens the resin shell of such microbeads and volatilizes or vaporizes the isobutane, thereby causing the shell to expand to form a very low density, strong, resilient monocellular microsphere. These microspheres may be expanded in a steam expander unit in a conventional manner prior to formulating the fitting material; however, it is preferred that they be expanded in situ, particularly using microwave energy.

Typical physical properties of unexpanded "Saran" Microspheres XD-8217 are as follows:

| | |
|---|---|
| Moisture | About 35% by weight |
| Solids (Polymer Plus) Encapsulated Isobutane) | About 65% by weight |
| Encapsulated isobutane on Dry Basis | 8 to 10% by weight |
| Dry Bulk Density | 45 lbs./ft.$^3$ |
| Dry True Density | 82.8 lbs./ft.$^3$ |
| Size of Spherical Particles | |
| Average Diameter | 6 to 8 microns |
| Diameter Range | 2 to 20 microns |
| Expanding or Foaming Temperature | 90 to 120° C. |

When the "Saran" Microspheres XD-8217 product is essentially fully, thermally-expanded or puffed (e.g. in a steam expander unit) at expanding or puffing temperatures, they are resilient, have good structural strength under loads which cause them to flex, and, more particularly, have the following typical physical properties:

| | |
|---|---|
| Dry Bulk Density | <1.0 lb./ft.$^3$ |
| Dry True Density | 1.5 to 2.3 lbs./ft.$^3$ |
| Size of Spherical Particles | |
| Average Diameter | 25 to 28 microns |
| Diameter Range | 10 to 80 microns |
| "K" Factor | 0.2 B.T.U. - in./hr./ft./° F. |
| Effect of Hydraulic Pressure on Microspheres | |
| Buckling | 10 to 50 psi. |
| Rupture | >900 psi. |
| Encapsulated Isobutane on Dry Basis | About 70% by weight loss of isobutane |

It should be noted that those expanded microspheres have low thermal conductivity, thereby providing good insulating means for preventing loss of heat from the foot at low temperatures.

If desired, the expanded or foamed "Saran" Microspheres XD-8217 product may be expanded or foamed to a lesser or, preferably, to a fuller extent. As the microspheres are expanded to a fuller extent, without loss of desired strength under load, they reach lower density and specific gravity values, and the density and specific gravity values of the resultant finished fitting material are likewise desirably lowered.

As previously discussed, one of the important advantages of using or incorporating expanded microbeads in the finished fitting material is to decrease the specific gravity of the fitting material. Accordingly, it is desirable to effect controlled, full or fuller expansion of the low density microbeads, and to use a low, but effective, level of expanded microbeads in the fitting material.

Dielectric heating generates controlled heat rapidly and uniformly in microbeads dispersed or suspended in an aqueous electrolytic medium. Water is a high loss factor material; that is, it readily absorbs microwave energy, which characterizes a "lossy" material. When high frequency electrical energy is thus used, that energy is rapidly converted to thermal energy, which, in turn, rapidly effects expansion of microbeads to provide discrete, monocellular, low density, expanded microbeads.

I have found that the expandable microbeads expand or foam faster and to a fuller, but controlled, volume, which is desirable, when they are subjected in situ to a high frequency electrical field, as opposed to the use of other heating procedures. Consequently, the extent of heating can be readily controlled to prevent over-heating the microbeads (e.g., avoid melting or fusing together the microbeads or destroying their hollow structure) and yet provide sufficient heat to essentially fully or more fully expand the microbeads and to provide unfractured or unbroken microbeads having desired structural characteristics under conditions of use.

It is not always necessary for the unexpanded microbeads themselves to absorm readily high frequency waves, but generally more efficient utilization of the high frequency electrical energy may result in instances where the microbeads, as well as the surrounding media, have a high loss factor and thus readily absorb microwave energy.

The method of heating the expandable microbeads can be important, particularly since the loss of the blowing or expanding agent generally is rapid upon the application of heat. The conduction of heat to the unexpanded microbeads from a liquid often results in a temperature gradient from the surface to the interior of the microbeads until thermal equilibrium is established. The permeability of the polymeric shell to loss of the blowing agent increases with the temperature. Accordingly, considerable encapsulated blowing agent can be lost from the microbeads before the interior is hot enough to expand or foam.

Heating the expandable microbeads by subjecting them to high frequency electrical energy, generally causes the interior of the hollow microbeads to heat more rapidly, but the surface layer may not be sufficiently heat-softened or heat-plastified to flow effectively under the influence of internal blowing stress.

Therefore, predetermined or requisite levels of microwave energy which effectively penetrate the mass may be supplied to rapidly heat the unexpanded microbeads substantially uniformly throughout the in situ system, as opposed to surface-heating using conventional heating processes, thereby providing heating means which rapidly and uniformly heats the individual microbeads at controllable temperatures and under controllable expansion conditions. When the expanded microbeads are to be used in fitting materials, those heat-expansion conditions obviate the impairment of the desired structural integrity, strength and resiliency of the hollow shells of discrete, expanded monocellular microbeads.

In Examples 1 and 2, below, unexpanded "Saran" Microspheres XD-8217 were subjected to a high frequency electrical field in situ and, consequently, were expanded in situ by means of microwave energy applied in a "Menumaster" Systems 70/80 Microwave Oven, sold by Litton Microwave Cooking Products, Minneapolis, Minn. In those Examples, that microwave oven had the following electrical specifications and was operated at high power:

| | |
|---|---|
| Voltage: | 190 to 240 volts AC 3-wire, single phase. |
| Amperage: | 30 amp. circuit, 60 cycles. |
| Wattage: | Standby 0-idle; 450 watts Operating high power: 5,400 watts; Operating low power: 2,700 watts; High power output: 2,000 watts at 220 volts; Low power output: 1,000 watts at 220 volts. |
| Frequency: | 2,450 mc. |
| Power: | 2 magnetrons. |

Furthermore, that microwave oven had a circulating fan that exhausted or vented boiling water, freed blowing agent and some liberated vinylidene chloride from the system.

It was found that for some unexplained reason the water present with wet, unexpanded "Saran" Microspheres XD-8217, the purchased form, apparently tends to cause the microbeads to agglomerate and stick together in clusters or clumps during or following in situ expansion using conventional external heating means, particularly if the system is maintained at a heated temperature too long. Such agglomeration of the microbeads causes the fitting material to develop a nonuniform, lumpy texture or consistency (as opposed to a smooth or substantially homogeneous texture or consistency), much like curds of cottage cheese, which is undesired.

For example, such levels of water caused coagulation or agglomeration of the microbeads when the fitting material was maintained at an expansion temperature of the microbeads (i.e., at about 200° to 210° F.) for a period as short as about 3 to 20 minutes. Accordingly, it was concluded that such undesired agglomeration of the microbeads is a function of the water present and the period of time at which the blend of the fitting material was maintained in a sufficiently hot state.

Attempting to avert agglomeration is difficult because one is faced with the problem of quickly heating the moist blend of fitting material to an appropriate temperature and quickly cooling the hot blend to a sufficiently lower temperature.

Alternatively, efforts were directed to removing water from the wet, unexpanded microbeads, as purchased. For example, in an effort to control the amount of water introduced into the blend of fitting material with the wet, unexpanded microbeads, some of the water initially present with the unexpanded microbeads was removed by subjecting the wet microbeads to conventional heating means, which, in turn, caused the undesired loss of some of the initially confined blowing agent from the microbeads and undesired loss of expanding action. Moreover, the removal of water from the wet, unexpanded microbeads causes a serious dust problem, since both unexpanded and expanded microspheres readily freely float in air.

The foregoing problems were effectively averted and an uniformly smooth, finished fitting material was produced by controllably heat-expanding the microbeads very rapidly by subjecting them in situ to high frequency electrical energy in a microwave oven. In addition, fuller, but controlled, expansion of the hollow microbeads was so-obtained.

The efficiency of the expansion of the microbeads may be evaluated by determining the specific gravity of the expanded microbeads and/or of the finished fitting material. Still further, the efficiency of the expansion of the microbeads may be judged by determining the diameter of individual expanded microbeads.

The information set forth in Table 1, below, shows typical true specific gravity values that were obtained for "Saran" Microspheres XD-8217 which were expanded by various expansion processes.

Table 1

| Method of Expansion | True Specific Gravity of Expanded Microspheres |
|---|---|
| 1) Conventional expansion of wet, unexpanded microspheres in a steam expander unit. | 0.032* |
| 2) Wet, unexpanded microspheres | |

Table 1-continued

| Method of Expansion | True Specific Gravity of Expanded Microspheres |
|---|---|
| were placed on a tray and heated in an oven at 200° F. | 0.082 |
| 3) Microwave heating, at 650 watts of radiated power, of 8.5 gms. of wet, unexpanded microspheres for one minute in the presence of 4.5 gms. of added water and 25.6 gms. of hot mineral oil (200° F.) layered on top of the water, which mixture was placed in an uncovered paper cup. After expansion of the microspheres, only 2 to 4% by weight of water remained. | 0.032 |
| 4) Microwave heating, at 650 watts of radiated power, of 8.5 gms. of wet, unexpanded microspheres for two minutes in the presence of 6 gms. of added water, which mixture was placed in a closed, quart-sized plastic bag of low heat capacity. Although the bag was closed, it was not impervious to the passage of water therethrough and some water could escape. | 0.027 |

*Specified by The Dow Chemical Company.

It was noted, for example, that a typical essentially fully expanded microbead formed from "Saran" Microspheres XD-8217 product had a diameter of about 0.003 inch (76.2 microns).

Table 1, above, shows that: method (1) provided full expansion, and, more particularly, fuller expansion than was achieved with method (2); method (3) provided a degree expansion comparable to method (1); and, method (4) provided fuller expansion than was achieved by each of methods (1), (2) and (3).

In comparing the specific gravity values of expanded hollow microbeads, it was noted that typical wax and oil components had specific gravity values of 0.90 and 0.88, respectively.

In my preferred method and system of heat-expanding expandable, hollow, thermoplastic microbeads having retained blowing agent (e.g., unexpanded, wet or partly dried "Saran" Microspheres XD-8217) by subjecting the microbeads to controlled, high frequency electrical energy (e.g., see Examples 1 and 2, below, and FIGS. 6 and 7), the unexpanded or not fully expanded microbeads are placed, distributed, or dispersed in a liquid medium to provide a temperature-controlling or temperature-compensating system having a combination of at least two different liquid materials, which, together and separately, provide temperature-compensating means for appropriately controlling and maintaining the expansion temperature of the microbeads. Each of the liquid materials is chemically compatible with the other and the microbeads. The microbeads are heated very rapidly by being subjected to high frequency radiation, which fully or more fully expands them under controlled temperature and expansion conditions. By pre-heating either or both of those liquid materials before introducing them to the system, the unexpanded microbeads may be more rapidly heated by the high frequency radiation.

More specifically, in my preferred method for controllably and rapidly expanding discrete, hollow, microbeads having a thermoplastic resinous shell and thermally-responsive blowing agent contained therein, one, for example, provides a controlled, selectively vented, expansion system of the microbeads substantially distributed in a temperature-compensating liquid medium having first and second, different liquid materials not identically susceptible to heating in the presence of a high frequency electrical field. Either or both of those liquid materials may comprise a combination of materials. The so-called first liquid material is characterized, for example, by having a prevailing boiling point within the system in the vicinity of the expansion temperature of the microbeads. The so-called second liquid material is characterized, for example, by having a prevailing boiling point within the system in excess of that of the first liquid material.

The system, for example, is subjected to controlled radiation by a heat-generating, high frequency electrical field of frequency and duration sufficient to effect heating the microbeads and liquid medium, and to permit the first liquid material to rapidly attain its prevailing boiling point without causing the second liquid material to concurrently attain its prevailing boiling point. Accordingly, the microbeads are radiation-heated at or to a temperature in the vicinity of their expansion temperature, and the first liquid material controls and maintains that temperature by means of providing a cooling action upon the radiation-heated microbeads while rapidly reaching its prevailing boiling point, whereupon the first liquid material essentially escapes from the system and the second liquid material remains in the system to control and maintain the expansion temperature of the radiation-heated microbeads by effecting a cooling action thereon by providing a heat sink which prevents them from being uncontrollably and rapidly radiation-heated at or to a temperature sufficiently high as to cause them to melt or fuse together, or to be destroyed.

The expansion of the microbeads, for example, is rapidly effected at a controlled temperature in the vicinity of the expansion temperature of the microbeads by means of the individual shells of the microbeads rapidly reaching their heat-softening or heat-plastification point and the contained thermally-responsive blowing agent exerting an expanding pressure thereupon to effect good, but non-destructive, rapid expansion of the microbeads.

One may selectively discontinue or terminate the heat-generating radiation to provide and recover the resultant heat-expanded microbeads substantially distributed in the resultant liquid medium or second liquid material.

By using such means to heat-expand the microbeads, full or fuller expansion of the microbeads may be achieved within a period as short as about 3 minutes, or less.

In operations using my preferred microwave-heating system, one of those liquid materials, usually water, of the system is characterized by absorbing the high frequency electrical energy, and consequently is quite lossy. That liquid material, for example, is present in an amount and at a temperature sufficient (a) to permit rapid attainment of its prevailing boiling point (the boiling point under the pressure conditions of the system) in the vicinity of the foaming or expansion temperature of the microbeads, (b) to control and maintain that temperature of the radiation-heated microbeads (which are heated by the high frequency electrical energy) at the prevailing boiling point of the liquid material, by effecting a cooling action thereon or by lowering the temperature of the shell of the microbeads at the surface thereof, (c) to boil-off and vaporize and thereupon to essentially escape with venting from the liquid medium during a controllable, short interval of time (characterized by the liquid medium then present exhibiting a temperature plateau or relatively or substantially constant temperature marking the progressive boiling-off of the first liquid material) while a second, different liquid material remains and is present to continue the control and maintenance of the radiation-heated microbeads at a temperature in the vicinity of their expansion temperature, and (d) to be essentially entirely removed with venting from the system (some small amount of residual water may remain) upon termination of said short time interval. Accordingly, the first liquid material maintains the temperature or cools the microbeads sufficiently to keep an effective amount of the blowing agent within the microbead-shells until the shells are sufficiently heat-softened or heat-plastified to be appropriately expanded by action of the blowing agent in the vicinity of the expansion temperature of the microbeads.

The unexpanded microbeads are sufficiently lossy to be heated by the use of the high frequency electrical energy, but effectively cooled by the first liquid material, so as not to be damaged or destroyed in the presence of sufficient levels of the first liquid material. The microbeads are lossier than the second liquid material, so that the second liquid material may act as a heat sink after the removal from the system of the first liquid material.

When water, for example, is used with unexpanded "Saran" Microspheres XD-8217 under prevailing pressure conditions which allow it to boil and vaporize as steam and escape from the system at a temperature of about 100° C., the temperature of the surface of the hollow microbeads is cooled or reduced to and maintained essentially at that temperature for a short time interval while the inside surface of the microbeads, which does not directly contact the water, may be, at the same instant, at a somewhat higher temperature. The boiling water is allowed to essentially entirely escape from the system in the form of steam, since in preparing the preferred fitting material, only tolerable, minimal or trace levels should be present in the finished fitting material (e.g., generally up to or not more than about 8% by weight, based on the weight of the finished fitting material, and preferably up to or not more than about 3% or 5% by weight). Only minimal or residual levels of available water generally are desired in the finished fitting material for the reasons explained above, although, apart from its high density, it generally does not significantly affect the desired functional action or characteristics of the fitting material.

If the foaming or expansion temperature of the microbeads is above the prevailing water boiling temperature, water may be used at higher temperatures in the form of pressurized steam, and such steam may act as the first liquid material as described above. For example, such steam may be introduced into the system, and appropriately removed from the system at a temperature in the vicinity of the expansion temperature of the microbeads.

If desired, the pressure exerted by the space above the liquid medium and microbeads may be controlled or adjusted to be at, below or above atmospheric pressure so that the selected first liquid material boils-off at the vicinity of the expansion temperature of the selected microbeads, thereby increasing one's choice of liquid media and microbeads. For example, by lowering that pressure, the rapid boiling and removal of the first liquid material may be facilitated significantly.

The second liquid material remains or is present after such removal of the first liquid material and prevents the microbeads from very rapidly being radiation-heated to higher temperatures sufficient to cause the microbeads to melt, fuse together, collapse or otherwise be damaged or destroyed within a short time interval.

In operations using my preferred microwave-heating system, the second liquid material, usually oil, glycerine or glycol, with or without wax, is present in a sufficient amount and at a sufficient temperature and is characterized by not boiling-off, vaporizing, and escaping from the system. It essentially remains in the system following the vented escape or removal of the first liquid material. It continues the control and maintenance of the temperature of the radiation-heated microbeads at a temperature in the vicinity of their expansion temperature by effecting a cooling action thereon by means of providing a heat sink for the microbeads, whereby the radiation-heated microbeads may continue to expand rapidly while the second liquid material prevents the microbeads from uncontrollably and rapidly being heated to a higher temperature sufficient to cause the radiation-heated microbeads to melt or fuse together, or to be destroyed. Consequently, the second liquid material maintains the microbeads at a controlled, heated temperature upon removal of most or essentially all of the first liquid material from the system, thereby obviating fine dust formation caused by the uncontrolled floating of the microbeads into the environment, and absorbs high frequency energy, although generally rather poorly, during and after such removal of the first liquid material from the system, to provide an important heat sink for the heated, still expanding, radiation-heated microbeads, thereby controlling the temperature and heat-expansion of the microbeads and effecting some cooling action thereupon.

Although wax, as well as oil, may be present in the second liquid material during the in situ expansion of the microbeads using high frequency electrical energy, I prefer not to include it in that liquid material. In order for the wax to be sufficiently liquid for handling and processing purposes, it generally must be heated to temperatures sufficiently high as to limit, to some degree, the role of the oil as a heat sink, thereby making the means of temperature control somewhat more difficult to achieve.

Upon completion of the full expansion of the microbeads using high frequency electrical energy, the expanded microbeads should be mixed sufficiently to provide for their being substantially uniformly dispersed or distributed. For example, the in situ system may be mixed during high frequency radiation, or between intervals of radiation.

As a result of the above-described preferred system of multiple, inter-temperature-compensating controls exerted by the first and second liquid materials upon the heated microbeads, and the use of controlled, high frequency waves emitted by the high frequency electrical energy source, the hollow microbeads are very rapidly heat-expanded in situ under controlled temperature conditions, whereby the shell of discrete microbeads is sufficiently heat-softened or heat-plastified and the retained blowing agent is volatilized or vaporized to provide for the blowing agent to exert sufficient expanding pressure on the confines of the shell to fully or more fully expand the individual microbeads without damaging or destroying the integral, continuous, sturdy, self-supporting structure of the hollow shell of the resultant expanded microbeads. For example, the occlusion of a separate and distinct, thermally-responsive, volatile organic liquid blowing agent becomes gaseous, followed by sufficient softening or heat-plastification of the shell walls to allow the blowing agent to exert expanding pressure upon the continuous interior of the shell walls. The expanded microbeads have a low specific gravity. When the expanded microbeads are used in fitting material, they should have good structural strength and resiliency. Still further, the resultant fitting material has a uniformly smooth consistency and appearance, and the previously described potential problem of agglomeration of the hot expanded microbeads is effectively and consistently avoided.

If desired, the foregoing methods for expanding thermoplastic, resinous hollow microbeads by subjecting them to controlled heat generated by high frequency electrical energy may be used to heat-expand such microbeads for uses other than in preparing a fitting material, although such methods are particularly well-suited for preparing my fitting material. For example, U.S. Pat. Nos. 3,676,288, 3,683,104 and 3,843,568 disclose other uses for microscopic spheres of expandable plastic filled with an expandable low-boiling liquid or vapor. Furthermore, if desired, for some purposes those methods may be applied to expand hollow, thermoplastic resinous beads that are larger than microbeads.

Referring next, for comparison purposes, to various finished fitting materials for use in boots, the use of wax (e.g., microcrystalline or paraffin wax) without any oil (e.g., without any petroleum-based or natural oil), or with an insufficient amount of combined and/or separately added oil (e.g., wax with only 10 to 15% by weight of combined oil and no separately added oil), provides an essentially hard fitting material which is not flowable, except under the special conditions used during custom-fitting to the shape of the foot, and does not provide desired pressure-compensating support during varying conditions of use. That wax product may be deformed under severe conditions of use; however, it is substantially rigid and does not undergo flow at ambient or room temperatures or pressures.

Without the presence of the microbeads, a viscous but flowable, pressure-compensating wax-oil blend having sufficient added oil is deformable during fitting to the shape of the foot, is substantially non-compressible under pressure loads generally encountered under normal conditions of use, and essentially is not resilient, even under conditions of load that deform that blend. During conditions of use, such fitting material may be resistant to flow in response to instantaneously applied pressure, but flows in response to continuously applied pressure, and provides firm, comfortable pressure-compensating support.

The use of resilient, hollow microbeads alone (without the presence of some amount of that same wax-oil blend having sufficient oil to provide a viscous but flowable, pressure-compensating blend under conditions of use), or the use of such microbeads in conjunction with only a limited amount of that wax-oil blend, an amount sufficient to merely lubricate or thinly coat each of the microbeads (e.g., expanded microbeads), provides a fitting material that is deformable during normal fitting to the shape of the foot, but under conditions of use generally is too resilient in responding to pressure loads; accordingly, such fitting material is too responsive to varying pressure loads generally encountered under normal conditions of use and tends to apply excessive or uncomfortable pressure to parts of the foot that need firm, pressure-compensating support but cannot comfortably withstand such responsiveness. Consequently, upon the application of sufficient instantaneous pressure during conditions of use, the expanded microbeads would tend to respond very quickly or instantaneously with like force, much like a spring, which is not desired. Appropriate amounts of expanded microbeads impart good thermal insulation properties to the fitting material, which may be desired.

However, with an appropriate but minor amount of distributed, resilient, expanded hollow microbeads, that same viscous but flowable wax-oil blend, when present in amounts sufficient to more than merely thinly coat substantially the entire outer surface of essentially each of the expanded microbeads, or more than merely form a film over the surface of essentially each of the expanded microbeads, maintains its viscous but flowable characteristics. The resultant fitting material (i.e., appropriate blend of wax-oil-expanded microbeads) may be appropriately confined and then fitted to the shape of the foot, and is compressible under pressure loads generally encountered under normal conditions of use; and under conditions of use, it is virtually resilient in the sense that the wax-oil-expanded microbead fitting material is momentarily or slowly, essentially or partly recoverable, as opposed to being instantaneously recoverable, upon the release or relief of pressure loads (i.e., deforming pressure) that deform the fitting material.

Consequently, during conditions of use, my wax-oil blend desirably "dampens" the resilient response provided by the expanded microbeads distributed therein. My fitting material thus provides a shock-absorbing system. In addition, during conditions of use, such fitting material having my wax-oil-expanded microbead blend is very desirably resistant to sag and to flow in response to instantaneously applied pressure, but readily flows in response to continuously applied pressure, and provides firm, comfortable pressure-compensating support. Moreover, when my fitting material is confined or sealed within an appropriate enclosure (particularly an appropriate resilient or elastomeric envelope enclosure), during conditions of use the resultant pad tends to slowly (as opposed to instantaneously) recover its shape upon release or relief of deforming pressure. Further, the expanded microbeads lower the overall specific gravity of the bulk of the fitting material, which is desired. Still further, a bulk of the fitting material may be pumped readily in a heated state during processing. Furthermore, limited amounts of appropriate expanded microbeads impart good thermal insulation and desirable resilient properties to the fitting material, lower the overall weight (density and specific gravity) of the fitting material, and do not detract from the desired flow and handling characteristics provided by the wax-oil portion. Still furthermore, it has been found that by using expanded "Saran" Microspheres XD-8217 in such finished fitting material, the fitting material generally does not stiffen or harden as much at low temperatures.

In preparing my finished fitting material, it is important that the wax and oil components be chemically compatible with each other and the microbeads. Further, my finished fitting material must be substantially homogeneous and have a substantially uniform or substantially smooth consistency or texture (e.g., not be lumpy). Furthermore, it is desirable that the flow characteristics of the finished fitting material not substantially or significantly change from those which characterize the fitting material at room temperature and temperatures of intended use (e.g., low temperatures).

The stiffness or hardness of my finished fitting material may be determined as static penetration at selected temperatures by dropping a small cone in accordance with ASTM D 217. The small cone is allowed to drop for 5 sec. onto and into the finished fitting material. The depth that the cone penetrates, in millimeters, is the penetrometer reading. Penetrometer readings decrease if the fitting material stiffens with a lowering of the temperature. For example, with a 50-gm. penetrometer load, the penetrometer reading may be between about 6 to 12 at a temperature of −20° F. and between about 10 to 24 at a temperature of 75° F.

Table 2-A, below, illustrates a broad range of amounts of materials or components that may be used in formulating various fitting materials. That Table contemplates expanding the hollow microbeads in situ, which is preferred; however, if desired, one could add or incorporate preexpanded hollow microbeads into a formulation.

More particularly, the formulations depicted in Table 2-A are based on using a particular wax product (i.e., HM 1319 wax of the HB Fuller Company) having 85% by weight of microcrystalline wax combined with 15% by weight of a petroleum-based oil (i.e., "Tufflo" 6204 oil), although the wax product used need not have been previously combined with any of the oil ultimately present in such finished formulations. Those formulations also are based on adding or incorporating the unexpanded microbeads (i.e., "Saran" Microspheres XD-8217 of the Dow Chemical Company) in a wet or water-moistened, unexpanded form (as purchased), having about 65% by weight of unexpanded microbeads (dry basis) and about 35% by weight of free water, since moist microbeads may be readily handled. Although the unexpanded microbeads of a fitting formulation may be expanded in situ in the presence of a substantial amount of added water which has been separately added as such (e.g., when the in situ expansion of the microbeads is effected using microwave-heating), the particular quantities of water shown in Table 2-A pertain to or include only water that is added with the wet, unexpanded microbeads. When microwave-heating is used, the amount of water that is added may be about 77% by weight of the dry, unexpanded microbeads, to provide about 112% by weight of total water, based on the dry weight of the unexpanded microbeads. Most, if not substantially all, of the total free water initially present in the fitting formulation should be removed during the course or as a result of in situ expansion of the microbeads at the prevailing water boilding temperature conditions.

Furthermore, the broad range of values set forth in Table 2-A were determined based on using (a) a wax-oil mix having from 25% to 90% by weight of HM 1319 wax, and from 75% to 10% by weight of separately added "Tufflo" 6204 oil, so that from 25% to 90% by weight of that particular wax product (with 15% by weight of oil) is present in the wax-oil mix with from 75% to 10% by weight of separately added "Tufflo" 6204 oil, and (b) from 1% to 9% by weight of dry, unexpanded microbeads (i.e., "Saran" Microspheres XD-8217), based on the total weight of the particular wax product (combined with 15% by weight of oil), the separately added oil, and the dry, unexpanded microbeads (i.e., "Saran" Microspheres XD-8217), although the microbeads are actually added in a wet form (about 35% by weight of free water).

When the microbeads are expanded using microwave-heating, from about 1% to 6% by dry weight of the microbeads may be used and water may be added, as such, in an amount which is about ½ the weight of the wet, unexpanded microspheres, as purchased; when the heat-expansion of the microbeads is conducted using other, conventional heating means, from about 3% to 9% by dry weight of the microbeads may be used.

It is desirable to provide a finished fitting material having up to or less than about 8% by weight of available water, since water generally has a higher density and higher specific gravity than the combination of all of the essential components of the fitting material (i.e., wax, oil and expanded microbeads) and tends to evaporate from the sealed envelope closure, thereby altering (i.e., decreasing) the predetermined volume of the fitting material, which is undesired.

The specific gravity of the finished fitting material may be from about 0.15 to about 0.8.

Tables 2-A and 2-B follow text.

Table 2-A

|  | Parts by Weight | Percent by Weight |
|---|---|---|
| Unexpanded, Hollow thermoplastic Microbeads (Dry Basis) | 1.01 to 9.89 | 0.99 to 8.58% |
| Wax (Excludes any Combined Oil) | 21.25 to 76.50 | 20.93 to 66.39% |
| Oil (Includes any Combined Oil) | 78.75 to 23.50 | 77.55 to 20.40% |
| Water (Added with Microbeads) | 0.54 to 5.33* | 0.53 to 4.63%* |
|  | 101.55 to 115.22 | 100% 100% |

*Additional free water may be initially added as such (e.g., when microwave heating is used), but is not included in Table 2-A.

Based on the foregoing formulations depicted in Table 2-A, the composition of those formulations is further summarized in Table 2-B, below.

Table 2-B

| | |
|---|---|
| 78.75 to 23.50% by | weight oil, based on weight of wax and oil |
| 77.96 to 21.39% by | weight oil, based on weight of wax, oil and dry, unexpanded microbeads |
| 21.25 to 76.50% by | weight wax, based on weight of wax and oil |
| 21.04 to 69.62% by | weight wax, based on weight of wax, oil and dry, unexpanded microbeads |
| 1.0 to 9.0% by | weight dry unexpanded microbeads, based on weight of dry unexpanded microbeads, wax and oil |
| 1 part by weight of unexpanded microbeads (dry basis) per 10.11 to 99.01 parts by weight of both wax and oil, or, based on a 70% by weight loss of blowing agent constituting 8 to 10% by weight of the dry, unexpanded microbeads, 1 to 1.015 parts by weight of expanded microbeads (dry basis) per 10.87 to 106.46 parts by weight of both wax and oil. | |

Table 3-A, below, illustrates a preferred range of amounts of materials or components that may be used in formulating various fitting materials. Table 3-A contemplates expanding the hollow microbeads in situ, which is preferred; however, if desired, one could add or incorporate preexpanded hollow microbeads into a formulation.

More particularly, the formulations depicted in Table 3-A are based on using HM-1319 wax of the HB Fuller Company. Those formulations also are based on adding or incorporating the unexpanded microbeads (i.e., "Saran" Microspheres XD-8217 of The Dow Chemical Company) in a wet or water-moistened, unexpanded form (as purchased). Although the unexpanded microbeads of a fitting formulation may be expanded in situ in the presence of a substantial amount of added water which has been separately added as such (e.g., when the in situ expansion of the microbeads is effected using microwave heating), the particular quantities of water shown in Table 3-A pertain to or include only water that is added with the wet, unexpanded microbeads. When microwave-heating is used, the amount of water that is added may be about 77% by weight of the dry, unexpanded microbeads to provide about 112% by weight of total water, based on the dry weight of the unexpanded microbeads. Most, if not substantially all, of the total free water initially present in the fitting formulation should be removed as a result of in situ expansion of the microbeads at the prevailing water boiling temperature conditions.

Furthermore, the preferred range of values set forth in Table 3-A were determined based on using (a) a wax-oil mix having from 40% to 65% by weight of HM 1319 wax, and from 60% to 35% by weight of separately added "Tufflo" 6204 oil, and (b) from 2% to 8% by weight of dry, unexpanded microbeads (i.e., "Saran" Microspheres XD-8217), based on the total weight of that particular wax product (combined with 15% by weight of oil), the separately added oil, and the dry, unexpanded microbeads (i.e., "Saran" Microspheres XD-8217), although the microbeads are actually added in a wet form (about 35% by weight of free water).

When the microbeads are expanded using microwave-heating, from about 2% to 3% by dry weight of the microbeads may be used and water may be added in an amount which is about ½ the weight of the wet, unexpanded microspheres, as purchased; when the heat expansion is conducted using other, conventional heating means, from about 4% to 8% by dry weight of the microbeads may be used.

It is preferred to provide a finished fitting material having up to or less than about 3% or 5% by weight of available water.

The preferred specific gravity of the finished fitting material, for example, is from about 0.3 to about 0.5.

Tables 3-A and 3-B follow next.

Table 3-A

|  | Parts by Weight | Percent by Weight |
|---|---|---|
| Unexpanded Hollow Thermoplastic Microbeads (Dry Basis) | 2.04 to 8.70 | 1.98 to 7.67% |
| Wax (Excludes any Combined Oil) | 34 to 55.25 | 32.96 to 48.73% |
| Oil (Includes any Combined Oil) | 66 to 44.75 | 63.99 to 39.47% |
| Water (Added with Microbeads) | 1.10 to 4.68* | 1.07 to 4.13%* |
|  | 103.14 to 113.38 | 100% 100% |

*Additional free water may be initially added as such (e.g., when microwave heating is used), but is not included in Table 3-A.

Based on the foregoing formulations depicted in Table 3-A, the composition of those formulations is further summarized in Table 3-B, below.

Table 3-B

| 66.0 to 44.75% | by weight oil, based on weight of wax and oil |
| 64.68 to 41.17% | by weight oil, based on weight of wax, oil and dry, unexpanded microbeads |
| 34.00 to 55.25% | by weight wax, based on weight of wax and oil |

Table 3-B-continued

| 33.32 to 50.83% | by weight wax, based on weight of wax, oil and dry, unexpanded microbeads |
| 2.0 to 8.0% | by weight dry, unexpanded microbeads, based on weight of dry, unexpanded microbeads, wax and oil |

1 part by weight of unexpanded microbeads (dry basis) per 11.49 to 49.02 parts by weight of both wax and oil, or, based on a 70% by weight loss of blowing agent constituting 8 to 10% by weight of dry, unexpanded microbeads, 1 to 1.015 parts by weight of expanded microbeads (dry basis) per 12.35 to 52.71 parts by weight of both wax and oil.

The foregoing tables (i.e., Tables 2-A, 2-B, 3-A and 3-B) are also generally applicable, perhaps with minor adjustments, when suitable non-petroleum-based waxes (e.g., animal waxes) and suitable non-petroleum-based oils (e.g., vegetable oils) are used.

The Examples set forth below are for purposes of illustration only, and the products of my invention and methods for making them are not necessarily limited thereto.

In each of those Examples, the unexpanded, but expandable, microbeads are heat-expanded in situ. FIGS. 6 to 9 are schematic representations which generally illustrate the methods depicted by Examples 1 to 4, respectively. Examples 1 and 2 concern heat-expanding the microbeads in situ by subjecting them to heating with high frequency electrical energy in a microwave oven. Example 5 is based upon and corresponds with the single Example set forth in my copending application Ser. No. 663,213, filed Mar. 2, 1976 and now abandoned.

EXAMPLE 1

Ninety ml. of hot water at 160° F. are added to 200 gms. of water-moistened, unexpanded "Saran" Microspheres XD-8217 (i.e., about 130 gm. of unexpanded microspheres on a dry basis and about 70 gm. of water). The mix is stirred. The stirred mix is poured into a polyethylene tub, after which 1,100 ml. of hot "Tufflo" 6204 oil at a temperature of 180° F. are added to the contents of the tub, and a fitted polyethylene lid is placed over the tub.

The covered tub is placed in a "Menumaster" Systems 70/80 Microwave Oven, supplied by the Litton Microwave Cooking Products, Minneapolis, Minn., operated at high power (i.e., high power output of 2,000 watts at 220 volts and a frequency of 2,450 mc.) for two minutes of continuous microwave radiation. When the microwave oven is operating, the circulating or exhaust fan is operated and removes or vents boiled-off water and blowing agent freed from the microbeads, as well as any liberated vinylidene chloride. The tub is removed from the microwave oven, the lid is removed, and the contents are stirred for about 30 sec.). The open tub again is placed in the microwave oven at high power, but using 10-sec. bursts of high frequency electrical energy until the mix is essentially dry (i.e., most, if not all, of the residual water is removed), which generally takes about 20 sec.

While the foregoing microwave-expansion of the "Saran" Microspheres XD-8217 in "Tufflo" 6204 oil is in progress, add 1,500 ml. of hot HM 1319 wax at a temperature of 220° F. to the mixing bowl of a Model F-20 (20 qt.) Electric Mixer of G. S. Blakeslee & Co., Chicago, Ill. (The bowl is kept in an oven at 200° F. between batches.) The mixer is operated until the resultant mix is homogeneous, but the mixing time should not exceed four minutes.

The microwave-heated mix is added to the hot wax already present in the mixing bowl, and mixing is continued. Another 1,100 ml. of hot "Tufflo" 6204 oil at a temperature of 180° F. are added to the mixing bowl and mixing is continued until the mix is homogeneous. The total mixing time should not exceed about 4 min.

The resultant smooth fitting material is poured at a temperature between about 130° to 170° F. (e.g., between 150° to 160° F.) to facilitate flow into a Model 31-A Electric Filler of Mateer-Burt Co., Wayne, Pa., so as to dispense a predetermined volume of hot, finished fitting material into the filling and venting ports 47 and 48 (shown in broken lines in FIG. 4) of the envelope enclosure of the fitting pad 40, shown in FIG. 4, after which those ports are heat-sealed. It is important to dispense the finished, smooth fitting material in a hot state so that the material is sufficiently flowable for dispensing purposes.

The predetermined volume of finished fitting material inserted into a particular size of envelope enclosure should be the same for ski boots designated for both the left and right foot. In providing filled envelope enclosures for five illustrative sizes of ski boots, the following illustrative volumes (with a variation of ± 10 ml.) of finished fitting material may be inserted into individual envelope enclosures of appropriate size (see FIG. 4) to provide a fitting pad 40 having a substantially uniform thickness of finished fitting material throughout the confines of the envelope enclosure:

| Assignee's Own Designation of Size of Boot | Volume of Added Fitting Material in Sealed Envelope Enclosure |
|---|---|
| 1 | 175 ml. |
| 2 | 205 ml. |
| 3 | 285 ml. |
| 4 | 360 ml. |
| 5 | 420 ml. |

It is important that the volume of finished fitting material inserted into the respective envelope enclosures of a particular volumetric size be controlled and substantially uniformly distributed therein. It is generally desirable to provide and maintain some effective thickness of fitting material about the ankle portion during conditions of use.

EXAMPLE 2

Forty parts by weight of hot HM 1319 wax, 55 parts by weight of hot "Tufflo" 6204 oil, and 2.5 parts by weight of hot water, all at a temperature of about 180° to 200° F., are added to a polyethylene tub and the contents are mixed. Five parts by weight of water-moistened, unexpanded "Saran" by weight of water) are added to and briefly stirred with the mix. A fitted polyethylene lid is placed over the tub.

The covered tub is placed in a "Menumaster" Systems 70/80 Microwave Oven at high power (i.e., high power output of 2,000 watts at 220 volts and a frequency of 2,450 mc.) for two minutes of continuous microwave radiation. When the microwave oven is operating, the circulating or exhaust fan is operated and removes or vents boiled-off water and blowing agent freed from the microbeads, as well as any liberated vinylidene chloride. The tub is removed from the microwave oven, the lid is removed, and the contents are briefly stirred for about 20 sec. The open tub again is placed in the microwave oven at high power for 30 sec. of continuous microwave radiation.

The resultant smooth fitting material is poured at a temperature between about 130° to 170° F. (e.g. between 150° to 160° F.) into a positive displacement type of pump or a Model 31-A Electrical Filler of Mateer-Burt Co., so as to disperse a pre-determined volume of the hot, smooth fitting material into the envelope enclosures. It is important to dispense the fitting material in a hot state so that the material is sufficiently flowable for dispensing purposes. After filling the envelope enclosures, the filled enclosures are sealed (e.g., heat-sealed).

EXAMPLE 3

Sixty parts by weight of hot HM-1319 wax and 40 parts by weight of "Tufflo" 6204 oil are mixed in a steam-jacketed metal autoclave at a temperature of about 200° F., so as to provide a substantially homogeneous mix at that temperature.

Six parts by weight of "Saran" Microspheres XD-8217 (i.e., about 3.9 parts by weight of unexpanded microspheres on a dry basis and about 2.1 parts by weight of water) are added to the contents of the heated autoclave with stirring.

The heated autoclave is sealed and mixing is continued for about 5 minutes to uniformly disperse the microspheres. Generally, I prefer not to heat the mix too long at 200° F.; the shorter, the better. It is desirable to apply a slight vacuum (e.g., a pressure of about 11 to 13 psi.) to the autoclave during the 5-min. period of mixing.

At the end of 5 min., sufficient air pressure may be applied to the contents of the autoclave to facilitate the pumping of the resultant fitting material from the autoclave into a positive displacement type of pump or a Model 31-A Electric Filler of Mateer-Burt Co., so as to dispense a predetermined volume of hot, finished fitting material into envelope enclosures. It is important to dispense the fitting material in a hot state (e.g. between about 130° to 170° F., or between 150° to 160° F.) so that the material is sufficiently flowable for dispensing purposes. After filling the envelope enclosures, the filled enclosures are sealed (e.g. heat-sealed).

EXAMPLE 4

The procedure of this Example is similar to that of Example 3, above, except that "Saran" Microspheres XD-8217 are partly dried, as indicated above. That drying step alleviates potential problems concerning providing a stable homogeneous mix of uniformly smooth consistency; however, that drying operation tends to reduce the degree of expansion of the microspheres and generally requires the use of a larger amount of the micropheres in order to achieve the same or comparable results.

Sixty parts by weight of hot HM-1319 wax and 40 parts by weight of "Tufflo" 6204 oil are mixed in a steamjacketed metal autoclave at a temperature of about 200° F., so as to provide a substantialy homogeneous mix at that temperature.

Eight parts by weight of "Saran" Microspheres XD-8217 (i.e., about 5.2 parts by weight of unexpanded microspheres on a dry basis and about 2.8 parts by weight of water) are partly dried in a conventional warm air drier at a temperature not exceeding 180° F., to remove 50 to 75% of the moisture present therewith and to provide a product having about 1.4 to 2.1 parts by weight of water and about 5.2 parts by weight of unexpanded microspheres on a dry basis. The partly dried microspheres are added to the contents of the heated autoclave with stirring.

The heated autoclave is sealed and mixing is continued for about 5 minutes to uniformly disperse the microspheres. Generally, I prefer not to heat the mix too long at 200° F; the shorter the better. It is desirable to apply a slight vacuum (e.g., a pressure of about 11 to 13 psi.) to the autoclave during the 5-min. period of mixing.

At the end of 5 min., sufficient air pressure may be applied to the contents of the autoclave to facilitate the pumping of the resultant fitting material from the autoclave into a positive displacement type of pump or a Model 31-A Electric Filler of Mateer-Burt Co., so as to dispense a predetermined volume of hot fitting material into envelope enclosures. It is important to dispense the fitting material in a hot state (e.g., between about 130° to 170° F., or between 150° to 160° F.) so that the material is sufficiently flowable for dispensing purposes. After filling the envelope enclosures, the filled enclosures are sealed (e.g., heat-sealed).

EXAMPLE 5

A mixture or blend of 80% by weight of a wax blend or mixture having 85% by weight of microcrystalline wax, 10% by weight of petroleum-based oil, and 5% by weight glycanol plasticizer (specially formulated and prepared by Leisure Research, Inc., U.S. Ski Wax Division), and 20% by weight of an added petroleum-based oil (i.e., "Topco" Motor Oil, S.A.E. 20 ) were stirred in a heated vessel, and the vessel was heated to about 200° F. to provide a hot liquid mixture or blend. A sufficient amount of water-moistened or wet, thermoplastic microbeads (i.e., "Saran" Microspheres XD-8217 product, supplied by The Dow Chemical Company) was added to provide a fitting mixture or blend having about 11% by weight of "Saran" Microspheres XD-8217 product (wet), about 71% by weight of the wax blend or mixture, and about 18% by weight of the added oil.

Table 4, below, refers to the materials or components used in this Example.

Table 4

|  | Parts by Weight |
|---|---|
| Unexpanded, Hollow Thermoplastic Microspheres (Dry Basis) | 8.06 |
| Microcrystalline Wax | 68 |
| Petroleum-Based Oil | 28 |
| Glycanol | 4 |
| Water (Added with Microspheres) | 4.34 |

The mixture or blend shown in Table 4, above, may be prepared by mixing about 12.4 parts of "Saran" Microspheres XD-8217 product (wet), 20 parts of motor oil, and 80 parts of the wax formulation having 85% of microcrystalline wax, 10% of petroleum-based oil, and 5% of glycanol.

The temperature of the vessel was maintained at about 90° C. to 120° C., with agitation, for about 1 to 2 minutes.

The individual microspheres underwent puffing or expansion in situ and provided significant resiliency to the fitting material, and the resultant viscous fitting material had good, but controlled, flow characteristics. The low density microspheres also reduced the weight of the fitting material a significant amount.

The resultant fitting mixture or blend was poured or extruded into molds of a predetermined shape and volume (i.e., thin aluminum pie tins), and the mixture was allowed to cool and harden in place to a self-supporting mass. In preparing fitting pads 10, such as shown in FIG. 1, it is desirable that the molds have a configuration close to that of the thermoplastic, protective envelope enclosure of the fitting pad 10.

The foregoing detailed description has been given for clearness of understanding only, and no unnecessary limitations should be understood therefrom, as modifications will be obvious to those skilled in the art.

I claim:

1. The method of rapidly heat-expanding by radiation-heating in liquid medium, discrete, hollow, expandable microbeads having a thermoplastic resinous shell and thermally-responsive blowing agent contained therein, to effect good, nondestructive, rapid expansion of the microbeads, which comprises:

(a) preparing a selectively vented, expansion system of said microbeads in a temperature-compensating liquid medium having first and second different liquid materials not identically susceptible to heating in the presence of a high frequency electrical field, (i) said first liquid material is characterized by readily absorbing high frequency electrical energy from a heat-generating, high frequency electrical field and by having and thereupon radpily reaching a prevailing boiling point within said system in the vicinity of the expansion temperature of said microbeads and which, upon being rapidly boiled and essentially escaping by being vented from the system, effects a cooling action on the microbeads, (ii) said second liquid material is characterized by having a prevailing boiling point within said system in excess of that of said first liquid material and providing within the system and upon said venting of first liquid material from the system, a heat sink for the microbeads, and (iii) said expandable microbeads being characterized by sufficiently absorbing high frequency energy from a heat-generating, high frequency electrical field so as to be heated, followed by the heated microbeads being subjected to said cooling action effected by first liquid material being rapidly boiled and vented from the system, followed by the heated microbeads being subjected to said heat sink provided by said second liquid material;

(b) subjecting said system to radiation-heating by a heat-generating, high frequency electrical field of frequency and duration sufficient to rapidly expand said microbeads within the system while said first and second liquid materials maintain the temperature of the microbeads contained therein in the vicinity of their expansion temperature, so that said radiation-heating effectively heats said liquid medium and microbeads within the system, whereupon said first liquid material rapidly attains its prevailing boiling point in the vicinity of the expansion temperature of the heated microbeads, said first liquid material rapidly boils and essentially escapes by being vented from the system and thereby effects a cooling action on the heated microbeads and consequently maintains their temperature in the vicinity of their expansion temperature, the liquid medium remaining and present in the system during the rapid vented escape of first liquid material having a substantially constant temperature, and said second liquid material remains in the system following said vented escape of first liquid material and consequently maintains the temperature of the heated microbeads in the vicinity of their expansion temperature by effecting a cooling action on heated microbeads by providing a heat sink which prevents heated microbeads contained therein from being heated to a temperature sufficiently high so as to cause them to melt or fuse together, or to be destroyed, while also providing for any continued expansion of the heated microbeads at a temperature in the vicinity of their expansion temperature;

said expansion of the microbeads by radiation-heating being rapidly effected and maintained at a temperature in the vicinity of the expansion temperature of the microbeads by means of the individual shells thereof rapidly being heat-softened and thermally-responsive blowing agent contained therein exerting an expanding pressure thereon, to effect good, but nondestructive, rapid expansion of the microbeads at a temperature in the vicinity of their expansion temperature; and, (c) selectively discontinuing said radiation-heating to provide said heat-expanded microbeads in the resultant liquid medium.

2. The method of claim 1, wherein at least one of said first and second different liquid materials is introduced to the system in a hot state, but at a temperature below the vicinity of the expansion temperature of the expandable microbeads.

3. The method of claim 1, wherein said first liquid material comprises water.

4. The method of claim 3, wherein said water is introduced to the system in a hot state, but at a temperature below the vicinity of the expansion temperature of the expandable microbeads.

5. The method of claim 1, wherein said second liquid material comprises oil.

6. The method of claim 5, wherein said oil is introduced to the system in a hot state, but at a temperature below the vicinity of the expansion temperature of the expandable microbeads.

7. The method of claim 1, wherein said second liquid material comprises a member of the group consisting of (a) oil and (b) oil and wax.

8. The method of claim 7, wherein said member of said second liquid material is introduced to the system in a hot state, but at a temperature below the vicinity of the expansion temperature of the expandable microbeads.

9. The method of claim 1, wherein said first liquid material comprises water and said second liquid material comprises oil.

10. The method of claim 9, wherein said second liquid material comprises a member of the group consisting of (a) oil and (b) oil and wax.

11. The method of claim 1, wherein said microbeads are microspheres.

12. The method of claim 1, wherein the shells of said microbeads are formed of vinylidene chloride and acrylonitrile.

13. The method of claim 1, wherein said microbeads are microspheres having shells formed of a vinylidene chloride-acrylonitrile copolymer.

14. The method of claim 1, wherein said heat-generating, high frequency electrical field is provided by microwave heating means.

15. The method of rapidly heat-expanding by radiation-heating in liquid medium, discrete, hollow, monocellular, expandable microbeads having a thermoplastic resinous shell and thermally-responsive, occluded, organic liquid blowing agent therein, to effect essentially full, or fuller nondestructive, rapid expansion of the microbeads, which comprises:

(a) preparing a selectively vented, expansion system of said microbeads in a temperature-compensating liquid medium having first and second different liquid materials not identically susceptible to heating in the presence of a high frequency electrical field, (i) said first liquid material is characterized by readily absorbing high frequency electrical energy from a heat-generating, high frequency electrical field and by having and thereupon rapidly reaching a prevailing boiling point within said system in the vicinity of the expansion temperature of said microbeads and which, upon being rapidly boiled and essentially escaping by being vented from the system, effects a cooling action on the microbeads, (ii) said second liquid material is characterized by having a prevailing boiling point within said system in excess of that of said first liquid material and providing within the system and upon said venting of first liquid material from the system, a heat sink for the microbeads, and (iii) said expandable microbeads being characterized by sufficiently absorbing high frequency energy from a heat-generating, high frequency electrical field so as to be heated, followed by the heated microbeads being subjected to said cooling action effected by first liquid material being rapidly boiled and vented from the system, followed by the heated microbeads being subjected to said heat sink provided by said second liquid material;

(b) subjecting said system to radiation-heating by a heat-generating, high frequency electrical field of frequency and duration sufficient to rapidly expand said microbeads within the system while said first and second liquid materials maintain the temperature of the microbeads contained therein in the vicinity of their expansion temperature, so that said radiation-heating effectively heats said liquid medium and microbeads within the system, whereupon said first liquid material rapidly attains its prevailing boiling point in the vicinity of the expansion temperature of the heated microbeads, said first liquid material rapidly boils and essentially escapes by being vented from the system and thereby effects a cooling action on the heated microbeads and consequently maintains their temperature in the vicinity of their expansion temperature, the liquid medium remaining and present in the system during said vented escape of first liquid material having a substantially constant temperature, and said second liquid material remains in the system following the rapid vented escape of first liquid material and consequently maintains the temperature of the heated microbeads in the vicinity of their expansion temperature by effecting a cooling action on heated microbeads by providing a heat sink which prevents heated microbeads contained therein from being heated to a temperature sufficiently high so as to cause them to melt or fuse together, or to be destroyed, while also providing for any continued expansion of heated microbeads at a temperature in the vicinity of their expansion temperature;

said expansion of the microbeads by radiation-heating being rapidly effected and maintained at a temperature in the vicinity of the expansion temperature of the microbeads by means of the individual shells thereof rapidly being heat-softened and thermally-responsive, organic liquid blowing agent occluded therein exerting an expanding pressure thereon, to effect essentially full, or fuller, but non-destructive, rapid expansion of the microbeads at a temperature in the vicinity of their expansion temperature; and, (c) selectively discontinuing said radiation-heating to provide said heat-expanded microbeads in second liquid material.

16. The method of claim 15, wherein at least one of said first and second different liquid materials is introduced to the system in hot state, but at a temperature below the vicinity of the expansion temperature of the expandable microbeads.

17. The method of claim 15, wherein said first liquid material comprises water.

18. The method of claim 17, wherein said water is introduced to the system in a hot state, but at a temperature below the vicinity of the expansion temperature of the expandable microbeads.

19. The method of claim 15, wherein said second liquid material comprises oil.

20. The method of claim 19, wherein said oil is introduced to the system in a hot state, but at a temperature below the vicinity of the expansion temperature of the expandable microbeads.

21. The method of claim 15, wherein said second liquid material comprises a member of the group consisting of (a) oil and (b) oil and wax.

22. The method of claim 21, wherein said member of said second liquid material is introduced to the system in a hot state, but at a temperature below the vicinity of the expansion temperature of the expandable microbeads.

23. The method of claim 15, wherein said first liquid material comprises water and said second liquid material comprises oil.

24. The method of claim 23, wherein said second liquid material comprises a member of the group consisting of (a) oil and (b) oil and wax.

25. The method of claim 15, wherein said microbeads are microspheres.

26. The method of claim 15, wherein the shells of said microbeads are formed of vinylidene chloride and acrylonitrile.

27. The method of claim 15, wherein said microbeads are microspheres having shells formed of a vinylidene chloride-acrylonitrile copolymer.

28. The method of claim 15, wherein said heat-generating, high frequency electrical field is provided by microwave heating means.

29. The method of producing viscous, flowable, pressure-compensating fitting composition having therein, a discontinuous phase of discrete, lightweight, sturdy, resilient, hollow, thermoplastic, resinous, in situ heat-expanded microbeads formed by rapidly heat-expanding by radiation-heating in liquid medium, discrete, hollow, expandable microbeads having a thermoplastic resinous shell and thermally-responsive blowing agent contained therein, which method comprises:

(a) preparing a selectively vented, expansion system of discrete, hollow, expandable microbeads having a thermoplastic resinous shell and thermally-responsive blowing agent contained therein, wherein said microbeads are in a temperature-compensating liquid medium having first and second different liquid materials not identically susceptible to heating in the presence of a high-frequency electrical field, (i) said first liquid material comprises water and is characterized by readily absorbing high frequency electrical energy from a heat-generating, high frequency electrical field and by having and thereupon rapidly reaching a prevailing boiling point within said system in he vicinity of the expansion temperature of said microbeads and which, upon being rapidly boiled and essentially escaping by being vented from the system, effects a cooling action on the microbeads, (ii) said second liquid material comprises a member of the group consisting of (1) oil and (2) oil and wax, and is characterized by having a prevailing boiling point witin said system in excess of that of said first liquid material and providing within the system and upon said venting of first liquid material from the system, a heat sink for the microbeads, and (iii) said expandable microbeads being characterized by sufficiently absorbing high frequency energy from a heat-generating, high frequency electrical field so as to be heated, followed by the heated microbeads being subjected to said cooling action effected by first liquid material being rapidly boiled and vented from the system, followed by the heated microbeads being subjected to said heat sink provided by said second liquid material;

(b) subjecting said system to radiation-heating by a heat-generating, high frequency electrical field of frequency and duration sufficient to rapidly expand said microbeads within the system while said first and second liquid materials maintain the temperature of the microbeads contained therein in the vicinity of their expansion temperature, so that said radiation-heating effectively heats said liquid medium and microbeads within the system, whereupon said first liquid material rapidly attains its prevailing boiling point in the vicinity of the expansion temperature of the heated microbeads, said first liquid material rapidly boils and essentially escapes by being vented from the system and thereby effects a cooling action on the heated mirobeads and consequently maintains their temperature in the vicinity of their expansion temperature, the liquid medium remaining and present in the system during the rapid vented escape of first liquid material having a substantially constant temperature, and said second liquid material remains in the system following said vented escape of first liquid material and consequently maintains the temperature of the heated microbeads in the vicinity of their expansion temperature by effecting a cooling action on heated microbeads by providing a heat sink which prevents heated microbeads contained therein from being heated to a temperature sufficiently high so as to cause them to melt or fuse together, or to be destroyed, while also providing for any continued expansion of heated microbeads at a temperature in the vicinity of their expansion temperature;

said expansion of the microbeads by radiation-heating being rapidly effected and maintained at a temperature in the vicinity of the expansion temperature of the microbeads by means of the individual shells thereof rapidly being heat-softened and thermally-responsive blowing agent contained therein exerting an expanding pressure thereon to effect good, but nondestructive, rapid expansion of the microbeads at a temperature in the vicinity of their expansion temperature; and, (c) selectively discontinuing said radiation-heating to provide said heat-expanded microbeads in second liquid material and threupon producing pressure-compensating fitting composition which is characterized by having a viscous, flowable, continuous phase comprising wax and oil, and having therein, a discontinuous phase of discrete, lightweight, sturdy, resilient, hollow, thermoplastic, resinous, in situ heat-expanded microbeads.

30. The method of claim 29, wherein the shells of said expanded microbeads are formed of vinylidene chloride and acrylonitrile.

31. The method of claim 29, whrein said expanded microbeads are microspheres.

32. The method of claim 29, wherein said microbeads are microspheres having shells formed of vinylidene chloride and acrylonitrile.

33. The method of claim 29, wherein said heat-generating, high frequency electrical field is provided by microwave heating means.

34. The method of claim 29, wherein at least one of said first and second different liquid materials is introduced to the system in a hot state, but at a temperature below the vicinity of the expansion temperature of the expandable microbeads.

35. The method of producing viscous, flowable, pressure-compensating fitting composition having therein, a discontinuous phase of discrete, lightweight, sturdy, resilient, hollow, monocellular, thermoplastic, resinous, in situ heat-expanded microbeads formed by rapidly heat-expanding by radiation-heating in liquid medium, discrete, hollow, expandable microbeads having a thermoplastic resinous shell and thermally-responsive blowing agent contained therein, which method comprises:

(a) preparing a selectively vented, expansion system of discrete, hollow, monocellular, expandable microbeads having a thermoplstic resinous shell and thermally-responsive blowing agent contained therein, wherein said microbeads are in a temperature-compensating liquid medium having first and second fifferent liquid materials not identically susceptible to heating in the presence of a high-frequency electrical field, (i) said first liquid material comprises water and is characterized by readily absorbing high frequency electrical energy from a heat-generating, high frequency electrical field and by having and thereupon rapidly reaching a prevailing boiling point within said system in the vicinity of the expansion temperature of said microbeads and which, upon being rapidly boiled and essentially escaping by being vented from the system, effects a cooling action on the microbeads, (ii) said second liquid material comprises a member of the group consisting of (1) oil and (2) oil and wax, and is characterized by having a prevailing boiling point within said system in excess of that of said first liquid material and providing within the system and upon said venting of first liquid material from the system, a heat sink for the microbeads, and (iii) said expandable microbeads being characterized by sufficiently absorbing high frequency energy from a heat-generating, high frequency electrical field so as to be heated, followed by the heated microbeads being subjected to said cooling action effected by first liquid material being rapidly boiled and vented from the system, followed by the heated microbeads being subjected to said heat sink provided by said second liquid material;

(b) subjecting said system to radiation-heating by a heat-generating, high frequency electrical field of frequency and duration sufficient to rapidly expand said microbeads within the system while said first and second liquid materials maintain the temperature of the microbeads contained therein in the vicinity of their expansion temperature, so that said radiation-heating effectively heats said liquid medium and microbeads within the system, whereupon said first liquid material rapidly attains its prevailing boiling point in the vicinity of the expansion temperature of the heated microbeads, said first liquid material rapidly boils and essentially escapes by being vented from the system and thereby effects a cooling action on the heated microbeads and consequently maintains their temperature in the vicinity of their expansion temperature, the liquid medium remaining and present in the system during said vented escape of first liquid material having a substantially constant temperature, and said second liquid material remains in the system following the rapid vented escape of first liquid material and consequently maintains the temperature of the heated microbeads in the vicinity of their expansion temperature by effecting a cooling action on heated microbeads by providing a heat sink which prevents heated microbeads contained threin from being heated to a temperature sufficiently high so as to cause them to melt or fuse together, or to be destroyed, while also providing for any continued expansion of heated microbeads at a temperature in the vicinity of their expansion temperature;

said expansion of the microbeads by radiation-heating being rapidly effected and maintained at a temperature in the vicinity of the expansion temperature of the microbeads by means of the individual shells thereof rapidly being heat-softened and thermally-responsive blowing agent contained therein exerting an expanding pressure thereon to effect good, but nondestructive, rapid expansion of the microbeads at a temperature in the vicinity of their expansion temperature;

(c) selectively discontinuing said radiation-heating to provide said heat-expanded microbeads in second liquid material; and, (d) selectively adding thereto, liquid material frm the group consisting of (1) oil, (2) wax, and (3) wax and oil, to provide pressure-compensating fitting composition which is characterized by having a viscous, flowable, continuous phase comprising wax and oil, and having therein, a discontinuous phase of discrete, lightweight, sturdy, resilient, hollow, monocellular, thermoplastic, resinous, in situ heat-expanded microbeads.

36. The method of claim 35, wherein the shells of said expanded microbeads are formed of vinylidene chloride and acrylonitrile.

37. The method of claim 35, wherein said expanded microbeads are microspheres.

38. The method of claim 35, wherein said expanded microbeads are microspheres having shells formed of vinylidene chloride and acrylonitrile.

39. The method of claim 35, wherein said heat-generating, high-frequency electrical field is provided by microwave heating means.

40. The method of claim 35, wherein at least one of said first and second different liquid materials is introduced to the system in a hot state, but at a temperature below the vicinity of the expansion temperature of the expandable microbeads.

41. The method of producing and dispensing into sealable, flexible, protective enclosure means, viscous, flowable, pressure-compensating fitting composition having therein, a discontinuous phase of discrete, lightweight, sturdy, resilient, hollow, thermoplastic, resinous, in situ heat-expanded microbeads formed by rapidly heat-expanding by radiation-heating in liquid medium, discrete, hollow, expandable microbeads having a thermoplastic resinous shell and thermally-responsive blowing agent contained therein, which method comprises:

(a) preparing a selectively vented, expansion system of discrete, hollow, expandable microbeads having a thermoplastic resinous shell and thermally-responsive blowing agent contained therein, wherein said microbeads are in a temperature-compensating liquid medium having first and second different liquid materials not identically susceptible to heating in the presence of a high-frequency electrical field, (i) said first liquid material comprises water and is characterized by readily absorbing high frequency electrical energy from a heat-generating, high frequency electrical field and by having and thereupon rapidly reaching a prevailing boiling point within said system in the vicinity of the expansion temperature of said microbeads and which, upon being rapidly boiled and essentially escaping by being vented from the system, effects a cooling action on the microbeads, (ii) said second liquid material comprises a member of the group consisting of (1) oil and (2) oil and wax, and is characterized by having a prevailing boiling point within said system in excess of that of said first liquid material and providing within the system and upon said venting of first liquid material from the system, a heat sink for the microbeads, and (iii) said expandable microbeads being characterized by sufficiently absorbing high frequency energy from a heat-generating, high frequency electrical field so as to be heated, followed by the heated microbeads being subjected to said cooling action effected by first liquid material being rapidly boiled and vented from the system, followed by the heated microbeads being subjected to said heat sink provided by said second liquid material;

(b) subjecting said system to radiation-heating by a heat-generating, high frequency electrical field of frequency and duration sufficient to rapidly expand said microbeads within the system while said first and second liquid materials maintain the temperature of the microbeads contained therein in the vicinity of their expansion temperature, so that said radiation-heating effectively heats said liquid medium and microbeads within the system, whereupon said first liquid material rapidly attains its prevailing boiling point in the vicinity of the expansion temperature of the heated microbeads, said first liquid material rapidly boils and essentially escapes by being vented from the system and thereby effects a cooling action on the heated microbeads and consequently maintains their temperature in the vicinity of their expansion temperature, the liquid medium remaining and present in the system during said vented escape of first liquid material having a substatantially constant temperature, and said second liquid material remains in the system following the rapid vented escape of first liquid material and consequently maintains the temperature of the heated microbeads in the vicinity of their expansion temperature by effecting a cooling action on heated microbeads by providing a heat sink which prevents heated microbeads contained therein from being heated to a temperature sufficiently high so as to cause them to melt or fuse together, or to be destroyed, while also providing for any continued expansion of heated microbeads at a temperature in the vicinity of their expansion temperature;

said expansion of the microbeads by radiation-heating being rapidly effected and maintained at a temperature in the vicinity of the expansion temperature of the microbeads by means of the individual shells thereof rapidly being heat-softened and thermally-responsive blowing agent contained therein exerting an expanding pressure thereon to effect good, but nondestructive, rapid expansion of the microbeads at a temperature in the vicinity of their expansion temperature;

(c) selectively discontinuing said radiation-heating to provide said heat-expanded microbeads in second liquid material and thereupon producing pressure-compensating fitting composition which is characterized by having a viscous, flowable, continuous phase comprising wax and oil, and having therein, a discontinuous phase of discrete, lightweight, sturdy, resilient, hollow, thermoplastic, resinous, in situ heat-expanded microbeads;

(d) delivering said fitting composition to volumetric dispensing means at an elevated temperature sufficient to facilitate its flow to and from said dispensing means; and, (e) selectively dispensing a desired volume of said fitting composition from said dispensing means into sealable, flexible, protective enclosure means.

42. The method of claim 41, wherein the shells of said expanded microbeads are formed of vinylidene chloride and acrylonitrile.

43. The method of claim 41, wherein said expanded microbeads are microspheres.

44. The method of claim 41, wherein said expanded microbeads are microspheres having shells formed of vinylidene chloride and acrylonitrile.

45. The method of claim 41, wherein said heat-generating, high frequency electrical field is provided by microwave heating means.

46. The method of claim 41, wherein said dispensing means selectively dispenses a desired volume of said fitting composition into individual members of a series of said enclosure means.

47. The method of claim 41, wherein at least one of said first and second different liquid materials is introduced to the system in a hot state, but at a temperature below the vicinity of the expansion temperature of the expandable microbeads.

48. The method of producing and dispensing into sealable, flexible, protective enclosure means, viscous, flowable, pressure-compensating fitting composition having therein, a discontinuous phase of discrete, lightweight, sturdy, resilient, hollow, monocellular, thermoplastic, resinous, in situ heat-expanded microbeads formed by rapidly heat-expanding by radiation-heating in liquid medium, discrete, hollow, expandable microbeads having a thermoplastic resinous shell and thermally-responsive blowing agent contained therein, which method comprises:

(a) preparing a selectively vented, expansion system of discrete, hollow, monocellular, expandable microbeads having a thermoplastic resinous shell and thermally-responsive blowing agent contained therein, wherein said microbeads are in a temperature-compensating liquid medium having first and second different liquid materials not identically susceptible to heating in the presence of a high-frequency electrical field, (i) said first liquid material comprises water and is characterized by readily absorbing high frequency electrical energy from a heat-generating, high frequency electrical field and by having and thereupon rapidly reaching a prevailing boiling point within said system in the vicinity of the expansion temperature of said microbeads and which, upon being rapidly boiled and essentially escaping by being vented from the system, effects a cooling action on the microbeads, (ii) said second liquid material comprises a member of the group consisting of (1) oil and (2) oil and wax, and is characterized by having a prevailing boiling point within said system in excess of that of said first liquid material and providing within the system and upon said venting of first liquid material from the system, a heat sink for the microbeads, and (iii) said expandable microbeads being characterized by sufficiently absorbing high frequency energy from a heat-generating, high frequency electrical field so as to be heated, followed by the heated microbeads being subjected to said cooling action effected by first liquid material being rapidly boiled and vented from the system, followed by the heated microbeads being subjected to said heat sink provided by said second liquid material;

(b) subjecting said system to radiation-heating by a heat-generating, high frequency electrical field of frequency and duration sufficient to rapidly expand said microbeads within the system while said first and second liquid materials maintain the temperature of the microbeads contained therein in the vicinity of their expansion temperature, so that said radiation-heating effectively heats said liquid medium and microbeads within the system, whereupon said first liquid material rapidly attains its prevailing boiling point in the vicinity of the expansion temperature of the heated microbeads, said first liquid material rapidly boils and essentially escapes by being vented from the system and thereby effects a cooling action on the heated microbeads and consequently maintains their temperature in the vicinity of their expansion temperature, the liquid medium remaining and present in the system during said vented escape of said first liquid material having a substantially constant temperature, and said second liquid material remains in the system following the rapid vented escape of first liquid material and consequently maintains the temperature of the heated microbeads in the vicinity of their expansion temperature by effecting a cooling action on heated microbeads by providing a heat sink which prevents heated microbeads contained therein from being heated to a temperature sufficiently high so as to cause them to melt or fuse together, or to be destroyed, while also providing for any continued expansion of heated microbeads at a temperature in the vicinity of their expansion temperature;

said expansion of the microbeads by radiation-heating being rapidly effected and maintained at a temperature in the vicinity of the expansion temperature of the microbeads by means of the individual shells thereof rapidly being heat-softened and thermally-responsive blowing agent contained therein exerting an expanding pressure thereon to effect good, but nondestructive, rapid expansion of the microbeads at a temperature in the vicinity of their expansion temperature;

(c) selectively discontinuing said radiation-heating to provide said heat-expanded microbeads in second liquid material;

(d) selectively adding thereto, liquid material from the group consisting of (1) oil, (2) wax, and (3) wax and oil, to provide pressure-compensating fitting composition which is characterized by having a viscous, flowable, continuous phase comprising wax and oil, and having therein, a discontinuous phase of discrete, lightweight, sturdy, resilient, hollow, monocellular, thermoplastic, resinous, in situ heat-expanded microbeads;

(e) delivering said fitting composition to volumetric dispensing means at an elevated temperature sufficient to facilitate its flow to and from said dispensing means; and, (f) selectively dispensing a desired volume of said fitting composition from said dispensing means into sealable, flexible, protective enclosure means.

49. The method of claim 48, wherein the shells of said expanded microbeads are formed of vinylidene chloride and acrylonitrile.

50. The method of claim 48, wherein said expanded microbeads are microspheres.

51. The method of claim 48, wherein said expanded microbeads are microspheres having shells formed of vinylidene chloride and acrylonitrile.

52. The method of claim 48, wherein said heat-generating, high frequency electrical field is provided by microwave heating means.

53. The method of claim 48, wherein said dispensing means selectively dispenses a desired volume of said fitting composition into individual members of a series of said enclosure means.

54. The method of claim 48, wherein at least one of said first and second different liquid materials is introduced to the system in a hot state, but at a temperature below the vicinity of the expansion temperature of the expandable microbeads.

* * * * *